(12) United States Patent
Nakayama

(10) Patent No.: US 11,089,229 B2
(45) Date of Patent: Aug. 10, 2021

(54) IN-VEHICLE CAMERA SYSTEM AND IMAGE PROCESSING APPARATUS

(71) Applicant: SONY CORPORATION, Tokyo (JP)

(72) Inventor: Satoshi Nakayama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/752,935

(22) Filed: Jan. 27, 2020

(65) Prior Publication Data

US 2020/0162652 A1    May 21, 2020

Related U.S. Application Data

(63) Continuation of application No. 15/575,572, filed as application No. PCT/JP2016/002203 on Apr. 26, 2016, now Pat. No. 10,582,131.

(30) Foreign Application Priority Data

Jun. 4, 2015 (JP) ................................. 2015-114084
Dec. 22, 2015 (JP) ................................. 2015-250573

(51) Int. Cl.
*H04N 5/235* (2006.01)
*G06K 9/00* (2006.01)
(Continued)

(52) U.S. Cl.
CPC ............. *H04N 5/2351* (2013.01); *B60Q 9/00* (2013.01); *B60R 1/00* (2013.01); *G06K 9/00825* (2013.01);
(Continued)

(58) Field of Classification Search
CPC .............. B60Q 2300/42; B60Q 1/085; B60Q 2300/41; B60Q 9/008; B60Q 1/04;
(Continued)

(56) References Cited

U.S. PATENT DOCUMENTS 4,811,410 A * 3/1989 Amir .................... G06T 7/0004
                                                   348/126
5,781,105 A * 7/1998 Bitar .................... B60Q 1/085
                                                   340/438

(Continued)

FOREIGN PATENT DOCUMENTS

DE  102013011975 A1  1/2015
EP      1513103 A2   3/2005

(Continued)

OTHER PUBLICATIONS

Office Action for JP Patent Application No. 2015-250573, dated Dec. 17, 2019, 04 pages of Office Action and 03 pages of English Translation.

(Continued)

*Primary Examiner* — Daniel Chang
(74) *Attorney, Agent, or Firm* — Chip Law Group

(57) ABSTRACT

Automatic exposure control of an in-vehicle camera is performed under dark driving environments such as at night. An in-vehicle camera system includes a vehicle camera mounted in a vehicle configured to capture surroundings of the vehicle, and control circuitry that controls an exposure level of an image captured by the vehicle camera, the control of the exposure level being based on brightness information of a detection area set within the image, the detection area being a portion of the captured image and configured to output the image having exposure control performed thereon to a display.

19 Claims, 37 Drawing Sheets

(51) Int. Cl.
*B60Q 9/00* (2006.01)
*B60R 1/00* (2006.01)
*H04N 5/232* (2006.01)

(52) U.S. Cl.
CPC ......... *H04N 5/235* (2013.01); *H04N 5/23245* (2013.01); *H04N 5/232945* (2018.08); *B60R 2300/307* (2013.01); *B60R 2300/8066* (2013.01); *H04N 5/23293* (2013.01)

(58) Field of Classification Search
CPC .... B60Q 1/12; B60Q 2300/32; B60Q 1/0023; B60Q 2300/3321; B60R 11/04; B60R 1/04; B60R 2001/1253; B60R 2300/8066; B60R 2300/8093; B60R 2300/8053; B60R 2300/105; B60R 2300/303; G06K 9/00825; G06K 9/00818; G06K 9/2027; B60W 2550/12; B60W 2550/308; G06T 2207/30261; G06T 7/13; G06T 2207/10016; G06T 7/174; H04N 5/2355
See application file for complete search history.

(56) References Cited

U.S. PATENT DOCUMENTS

| | | | |
|---|---|---|---|
| 6,674,475 B1 * | 1/2004 | Anderson | H04N 5/2351 348/294 |
| 2003/0031008 A1 * | 2/2003 | Kobayashi | B60Q 1/085 362/37 |
| 2004/0105027 A1 | 6/2004 | Kawamura et al. | |
| 2004/0143380 A1 * | 7/2004 | Stam | H05B 47/17 701/36 |
| 2005/0036660 A1 | 2/2005 | Otsuka et al. | |
| 2005/0275562 A1 * | 12/2005 | Watanabe | B60Q 1/18 340/933 |
| 2006/0126136 A1 | 6/2006 | Satou et al. | |
| 2006/0274917 A1 * | 12/2006 | Ng | G06K 9/3241 382/103 |
| 2007/0221822 A1 * | 9/2007 | Stein | G06K 9/00825 250/205 |
| 2008/0030374 A1 * | 2/2008 | Kumon | G06K 9/3241 340/937 |
| 2008/0056537 A1 | 3/2008 | Furusawa | |
| 2008/0169912 A1 * | 7/2008 | Kawasaki | G06K 9/00805 340/425.5 |
| 2008/0278577 A1 | 11/2008 | Otsuka et al. | |
| 2009/0174808 A1 | 7/2009 | Mochida et al. | |
| 2009/0174809 A1 * | 7/2009 | Mochida | G03B 7/28 348/362 |
| 2009/0252377 A1 * | 10/2009 | Akita | G06K 9/3241 382/106 |
| 2009/0274340 A1 * | 11/2009 | Wilson | G01N 33/12 382/110 |
| 2009/0296415 A1 * | 12/2009 | Heinrich | B60Q 1/143 362/465 |
| 2009/0323366 A1 | 12/2009 | Furusawa | |
| 2011/0147101 A1 * | 6/2011 | Bateman | G06F 3/04166 178/18.06 |
| 2011/0181511 A1 * | 7/2011 | Yang | H04N 5/2351 345/158 |
| 2012/0188373 A1 * | 7/2012 | Kwon | H04N 1/409 348/148 |
| 2012/0206707 A1 * | 8/2012 | Usami | G01C 3/10 356/3.1 |
| 2012/0287276 A1 * | 11/2012 | Dwivedi | G06K 9/00825 348/148 |
| 2013/0050570 A1 * | 2/2013 | Ishigaki | H04N 5/2351 348/362 |
| 2013/0058592 A1 * | 3/2013 | Schwarzenberg | G06K 9/00825 382/274 |
| 2013/0182111 A1 | 7/2013 | Ogasawara | |
| 2014/0355827 A1 * | 12/2014 | Ogawa | B60Q 1/143 382/103 |
| 2015/0049193 A1 * | 2/2015 | Gupta | H04N 17/002 348/148 |
| 2015/0085507 A1 * | 3/2015 | Hoffmann | B60Q 1/085 362/465 |
| 2015/0131086 A1 * | 5/2015 | Morishita | B60Q 1/14 356/218 |

FOREIGN PATENT DOCUMENTS

| | | |
|---|---|---|
| EP | 1895766 A1 | 3/2008 |
| EP | 2138350 A2 | 12/2009 |
| EP | 2879386 A1 | 6/2015 |
| JP | 2004-048455 A | 2/2004 |
| JP | 2005-092857 A | 4/2005 |
| JP | 2006-222844 A | 8/2006 |
| JP | 2007-022454 A | 2/2007 |
| JP | 2008-054170 A | 3/2008 |
| JP | 2008-060873 A | 3/2008 |
| JP | 4253271 B2 | 4/2009 |
| JP | 4258539 B2 | 4/2009 |
| JP | 2009-177311 A | 8/2009 |
| JP | 2010-510935 A | 4/2010 |
| JP | 2013-147112 A | 8/2013 |
| JP | 2015-051738 A | 3/2015 |
| WO | 2014/017625 A1 | 1/2014 |

OTHER PUBLICATIONS

Non-Final Office Action for U.S. Appl. No. 15/575,572, dated Apr. 4, 2019, 24 pages.
Notice of Allowance for U.S. Appl. No. 15/575,572, dated Oct. 17, 2019, 10 pages.
Notice of Allowance for U.S. Appl. No. 15/575,572, dated Dec. 27, 2019, 03 pages.
Notice of Allowance for U.S. Appl. No. 15/575,572, dated Jan. 30, 2020, 03 pages.
Office Action for JP Patent Application No. 2015-250573, dated Oct. 15, 2019, 07 pages of Office Action and 05 pages of English Translation.
Office Action for EP Patent Application No. 16725611.4, dated Jul. 18, 2019, 06 pages of Office Action.
International Search Report and Written Opinion of PCT Application No. PCT/JP2016/002203, dated Aug. 9, 2016, 08 pages of ISRWO.
International Preliminary Report on Patentability of PCT Application No. PCT/JP2016/002203, dated Dec. 14, 2017, 07 pages of IPRP.
Office Action for JP Patent Application No. 2020-017066, dated Oct. 13, 2020, 05 pages of English Translation and 05 pages of Office Action.
Office Action for JP Patent Application No. 2020-017066, dated May 25, 2021, 04 pages of English Translation and 03 pages of Office Action.

* cited by examiner

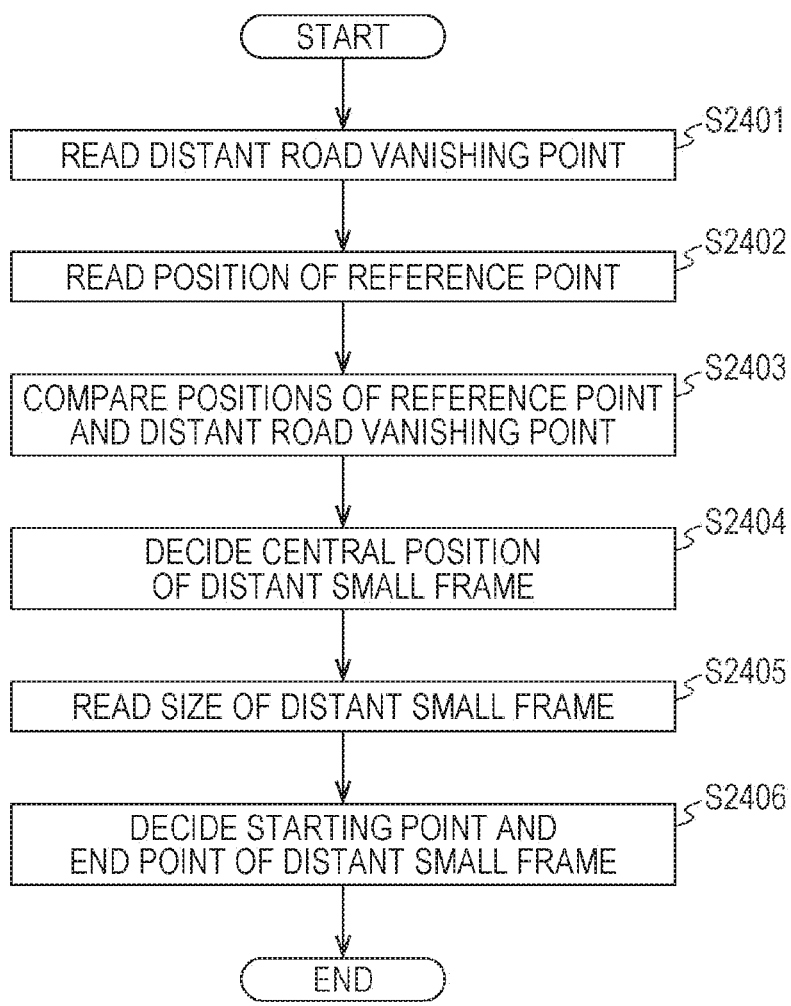

IN-VEHICLE CAMERA SYSTEM AND IMAGE PROCESSING APPARATUS

CROSS REFERENCE TO RELATED APPLICATIONS

The present application is a continuation application of U.S. patent application Ser. No. 15/575,572, filed on Nov. 20, 2017, which is National Stage Entry of Patent Application No. PCT/JP2016/002203, filed on Apr. 26, 2016, which claims priority from Japanese Patent Application No. JP 2015-250573, filed Dec. 22, 2015 and Japanese Patent Application No. JP 2015-114084 filed on Jun. 4, 2015, the entire contents of which are incorporated by reference.

TECHNICAL FIELD

The present technology relates to an in-vehicle camera system that performs exposure control on a camera mounted in a vehicle, and an image processing apparatus that performs exposure control based on images shot by the in-vehicle camera.

BACKGROUND ART

An increasing number of automobiles have recently been equipped with cameras. Images shot by the in-vehicle camera can be used to provide driving support and visual field support. For example, based on the images shot by the in-vehicle camera, the location and direction of the vehicle can be detected and used for guidance information, and oncoming vehicles, preceding vehicles, pedestrians, obstacles, and others can be detected for accident prevention. In addition, during night-time driving, the images shot by the in-vehicle camera can be processed to sense the headlights of the oncoming vehicle (or following vehicle) and the taillights of the preceding vehicle and detect information on the other surrounding vehicles (for example, refer to PTLs 1 and 2).

CITATION LIST

Patent Literatures

[PTL 1]
JP 2005-92857 A
[PTL 2]
JP 2010-272067 A
[PTL 3]
JP 2004-23226 A
[PTL 4]
JP 2013-205867 A

SUMMARY

Technical Problem

It is desirable to provide an in-vehicle camera system that performs exposure control on a camera mounted in a vehicle, and an image processing apparatus that performs an exposure control based on images shot by the in-vehicle camera.

Solution to Problem

The technique disclosed in the present specification was made in view of the above problem, and a first aspect of the present technology provides an in-vehicle camera system including: a vehicle camera mounted in a vehicle configured to capture surroundings of the vehicle, and control circuitry configured to control an exposure level of an image captured by the vehicle camera, the control of the exposure level being based on brightness information of a detection area set within the image, the detection area being a portion of the captured image and configured to output the image having exposure control performed thereon to a display.

The term "system" here refers to a logical assembly of a plurality of devices (or functional modules implementing specific functions), regardless of whether the devices or functional modules are included in a single housing.

According to a second aspect of the technology there is provided an image processing apparatus, including: control circuitry configured to control an exposure level of an image captured by a vehicle camera, the control of the exposure level being based on brightness information of a detection area set within the image, the detection area being a portion of the captured image and configured to output the image having exposure control performed thereon to a display.

According to a third aspect of the technology there is provided an image processing method, including: controlling, using control circuitry, an exposure level of an image captured by a vehicle camera, the control of the exposure level being based on brightness information of a detection area set within the image, the detection area being a portion of the captured image, and outputting the image having exposure control performed thereon to a display.

Advantageous Effects of Invention

According to an embodiment of the technology disclosed herein, it is possible to provide an in-vehicle camera system that performs exposure control on a camera mounted in a vehicle, and an image processing apparatus that performs exposure control based on images shot by the in-vehicle camera.

The advantageous effects described herein are mere examples, and the advantageous effects of the present technology are not limited to them. In addition, the present technology may have additional advantageous effects other than the ones described above.

Other objectives, features, and advantages of the technology disclosed herein will be clarified by more detailed descriptions of the following embodiments and the accompanying drawings.

BRIEF DESCRIPTION OF DRAWINGS

FIG. 24 is a flowchart of a process for defining a distant small frame for prioritizing detection of the lamps of an automobile.

DESCRIPTION OF EMBODIMENTS

Embodiments of the technology disclosed herein will be described below in detail with reference to the drawings.

Figure 1:
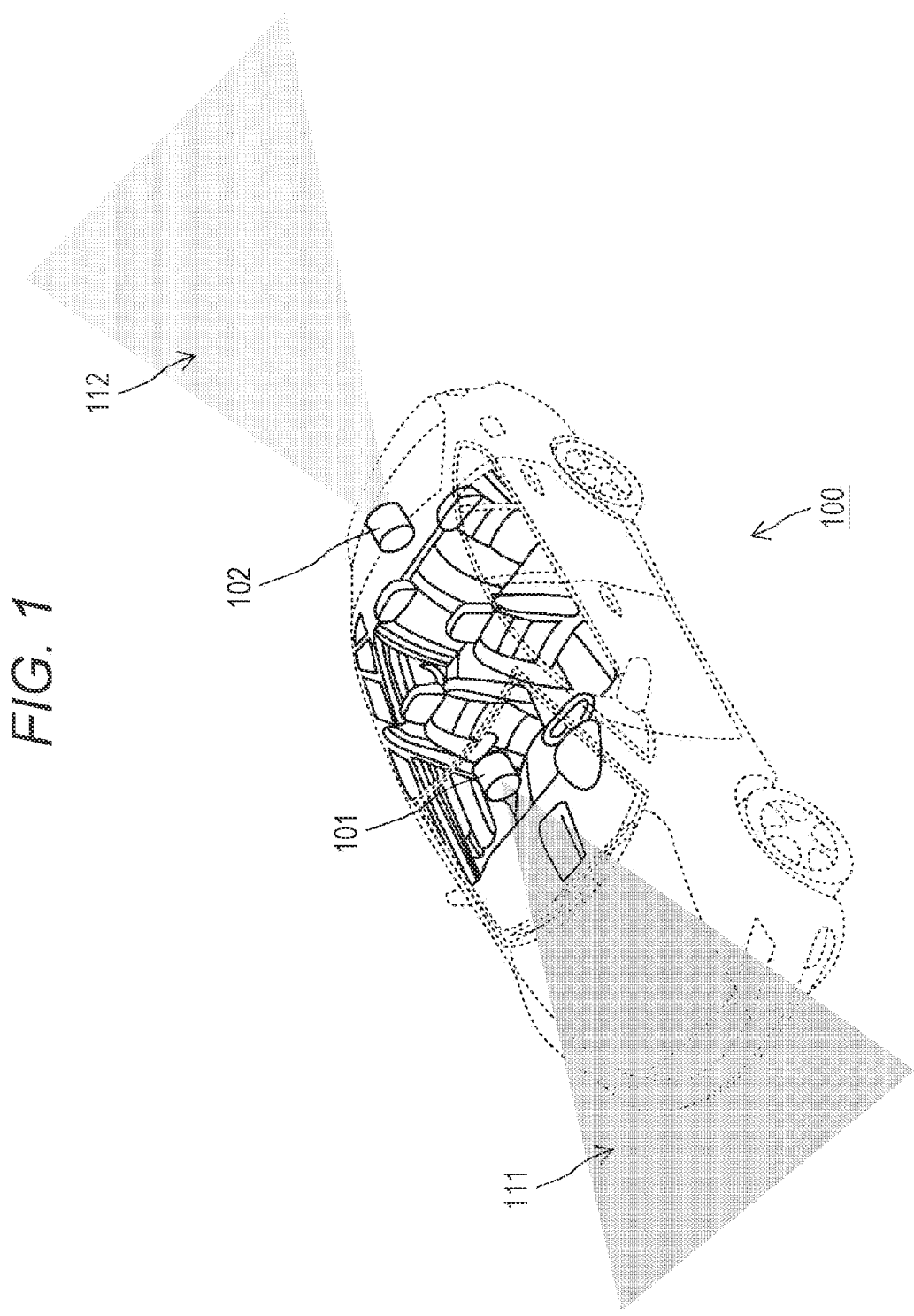
FIG. 1 is a diagram illustrating an example in which cameras are mounted inside the interior of an automobile 100.
Figure 2:
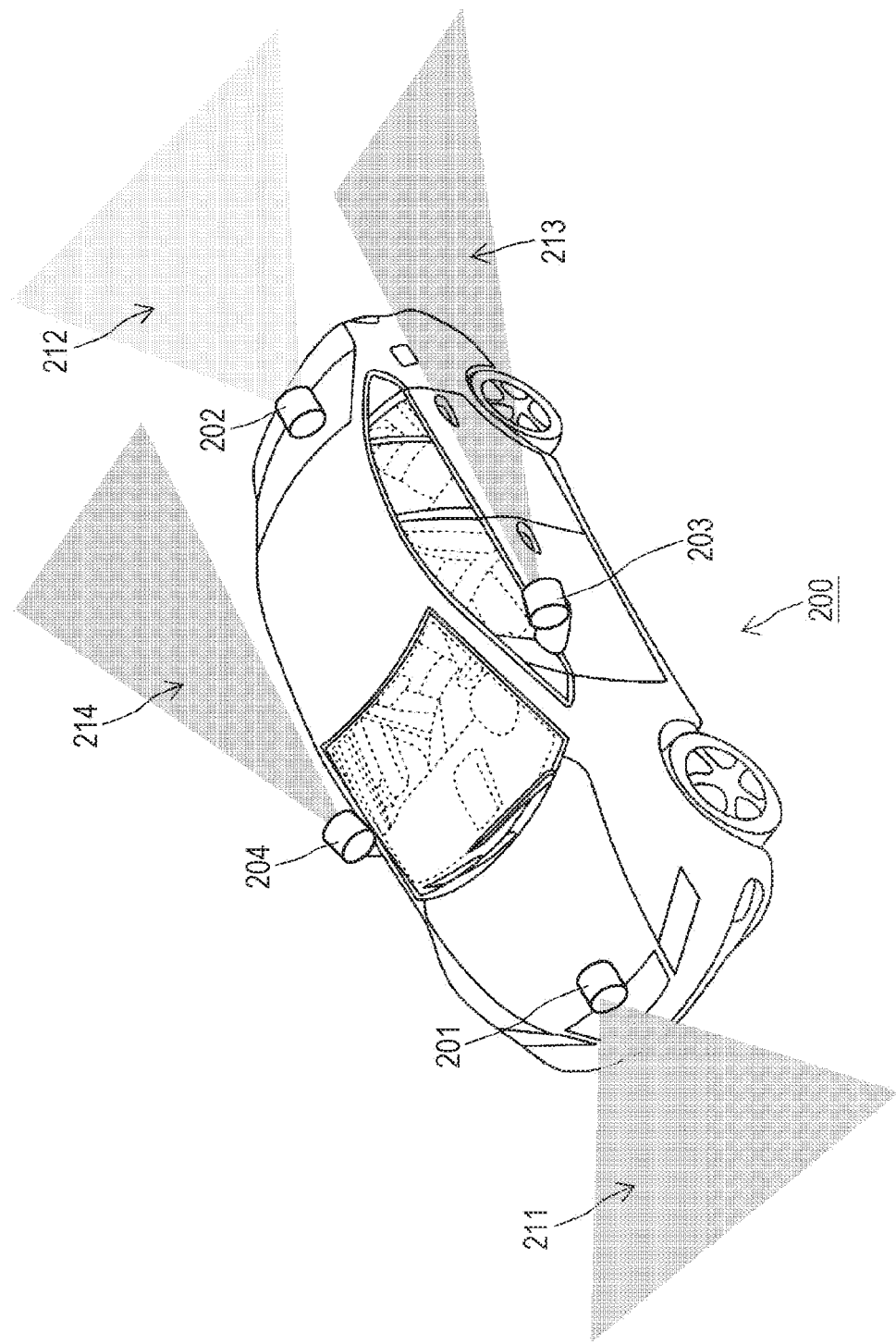
FIG. 2 is a diagram illustrating an example in which cameras are mounted outside the interior of an automobile 200.

FIG. 1 illustrates an example in which cameras are mounted in an automobile (standard-sized passenger car) 100. Referring to FIG. 1, two cameras 101 and 102 are mounted inside the interior of the automobile 100. One camera 101 has an imaging direction oriented to the area ahead of the automobile 100 (driving direction), and is placed near the front window (room mirror), for example. The other camera 102 has a shooting direction oriented toward the area behind the automobile 100, and is placed near the rear window at the back of the interior, for example. In the example illustrated in FIG. 1, the other camera 102 is arranged in the vehicle interior to shoot the area behind the automobile 100 through the rear window (alternatively, the area behind the automobile 100 may be shot by a camera 202 arranged outside the vehicle, as illustrated in FIG. 2 (described later)). The viewing angles of the cameras 101 and 102 are indicated with their respective reference numbers 111 and 112. The camera 101 can shoot a preceding vehicle or an oncoming vehicle in the area ahead of the subject vehicle in the driving direction. The camera 102 can also shoot a following vehicle in the area behind the subject vehicle in the driving direction. The cameras 101 and 102 can be fixed by any method to their positions in the vehicle.

FIG. 2 illustrates another example in which cameras are mounted in an automobile (standard-sized passenger car) 200. Referring to FIG. 2, four cameras 201 to 204 are mounted outside the interior of the automobile 200. The camera 201 is placed at the front end of the automobile 200 (for example, near the front grill or the front bumper cover) to shoot the area ahead of the subject vehicle (in the driving direction). The camera 202 is placed at the rear end of the automobile 200 (for example, near the rear bumper cover) to shoot the area behind the subject vehicle. The cameras 203 and 204 are placed near the leading ends of right and left door mirrors with shooting directions oriented to the area behind the automobile 200. The cameras 203 and 204 may be used in combination with the right and left door mirrors. Alternatively, the cameras 203 and 204 may replace the right and left door mirrors. The viewing angles of the cameras 201 to 204 are indicated with their respective reference numbers 211 to 214. The camera 201 can shoot a preceding vehicle and an oncoming vehicle in the area ahead of the subject vehicle in the driving direction. The cameras 202 to 204 can also shoot a following vehicle in the area behind the subject vehicle in the driving direction. The cameras 201 to 204 can be fixed by any method to their positions in the vehicle.

The technology disclosed herein is based on the assumption that one or more cameras (in-vehicle cameras) are mounted in an automobile. The placement positions of the in-vehicle cameras illustrated in FIGS. 1 and 2 are mere examples. The in-vehicle cameras may be placed at positions other than the foregoing ones in the vehicle. Two or more in-vehicle cameras may be combined. The vehicles in which the in-vehicle cameras are mounted are not limited to standard-sized passenger vehicles but may be medium-sized vehicles, large-sized vehicles, or two-wheel vehicles such as motorcycles.

Under dark driving environments such as at night or in a tunnel, images shot by the in-vehicle camera can be processed to sense the headlights of a following vehicle (or an oncoming vehicle) and the taillights of a preceding vehicle and detect information on the other surrounding vehicles (as described above). For example, it is necessary to check the distant following vehicle to change lanes on an expressway. However, it is difficult to recognize clearly the shape of the surrounding vehicle in dark conditions such as at night. In general, a driver perceives visually the status of approaching of the surrounding vehicle through its right and left lights or the like. Accordingly, it is necessary to control the camera to check visually the separation of the right and left light sources.

The exposure control technology applied to normal (or common) photo shooting or in-room video shooting is basically intended to subject the entire screen to average exposure control. For example, there is exposure control method by which the screen is simply divided into a plurality of sections as brightness detection frames, and the sums of incident light in the individual detection frames are integrated to obtain the amount of light, and the exposure of the camera is automatically controlled based on the amount of light (for example, refer to PTL 3). In addition, there is exposure control method by which the amounts of light are weighted and integrated in the individual detection frames for the optimum light exposures for individual scene, and automatic exposure and gain adjustment of the camera are performed suited to the actual scenes.

However, when the in-vehicle camera shots a following or preceding vehicle (hereinafter, referred to as "distant vehicle") at a predetermined distance L (for example, L=about 150 m) from the subject vehicle, the proportion of the headlights (or taillights) as light sources of the distant vehicle in the viewing field of the in-vehicle camera is small. Accordingly, the application of the method by which exposure control is averagely performed on the entire screen would lead to a (long) light exposure time for low illumination that is likely to cause overexposure. For example, when the screen is simply divided into a plurality of regions as detection frames and the brightness values in the detection frames are weighted, the proportion of the noticed vehicle in the detection frame is too small. Therefore, even though the applicable detection frame is weighted increasingly, the expression of average brightness of the screen is prioritized to make it difficult to perform a stable automatic exposure control.

Figure 3:
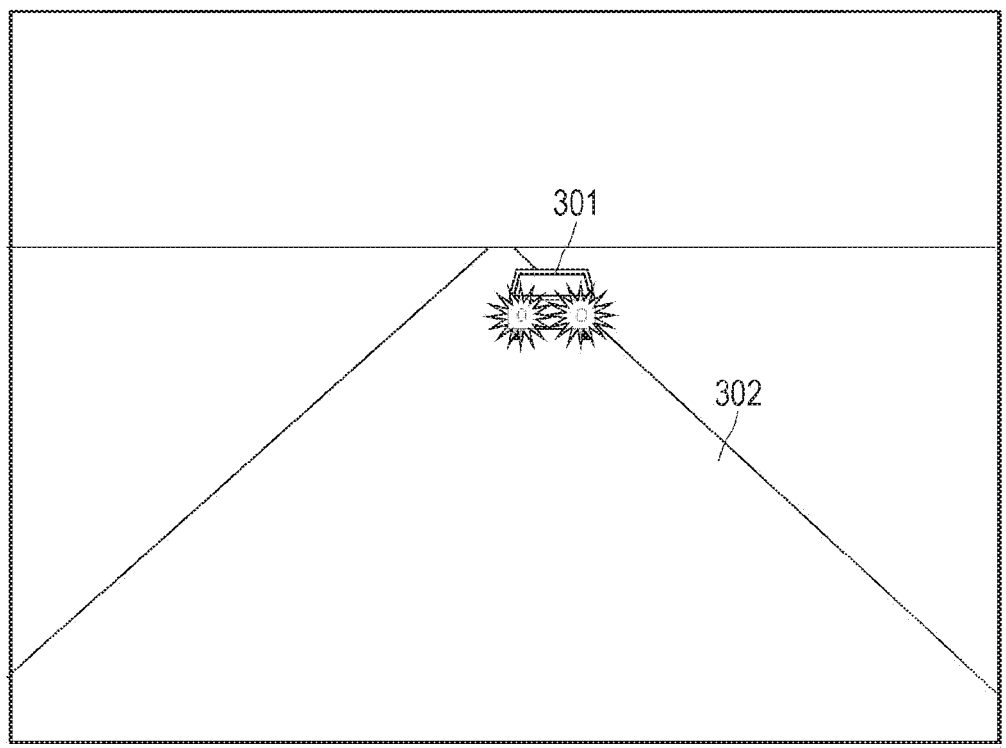
FIG. 3 is a diagram illustrating a scene ahead of or behind the vehicle (at night or in a tunnel).

The case in which the in-vehicle camera shots a scene ahead of or behind the vehicle (viewable on a door mirror or a room mirror) under dark driving environments such as at night or in a tunnel as illustrated in FIG. 3 will be discussed. It is assumed that, in the scene illustrated in FIG. 3, a following vehicle 301 is driving on a road (left lane) 302 behind the subject vehicle. Under dark driving environments, the following vehicle 301 has the two right and left headlights turned on.

Figure 4:
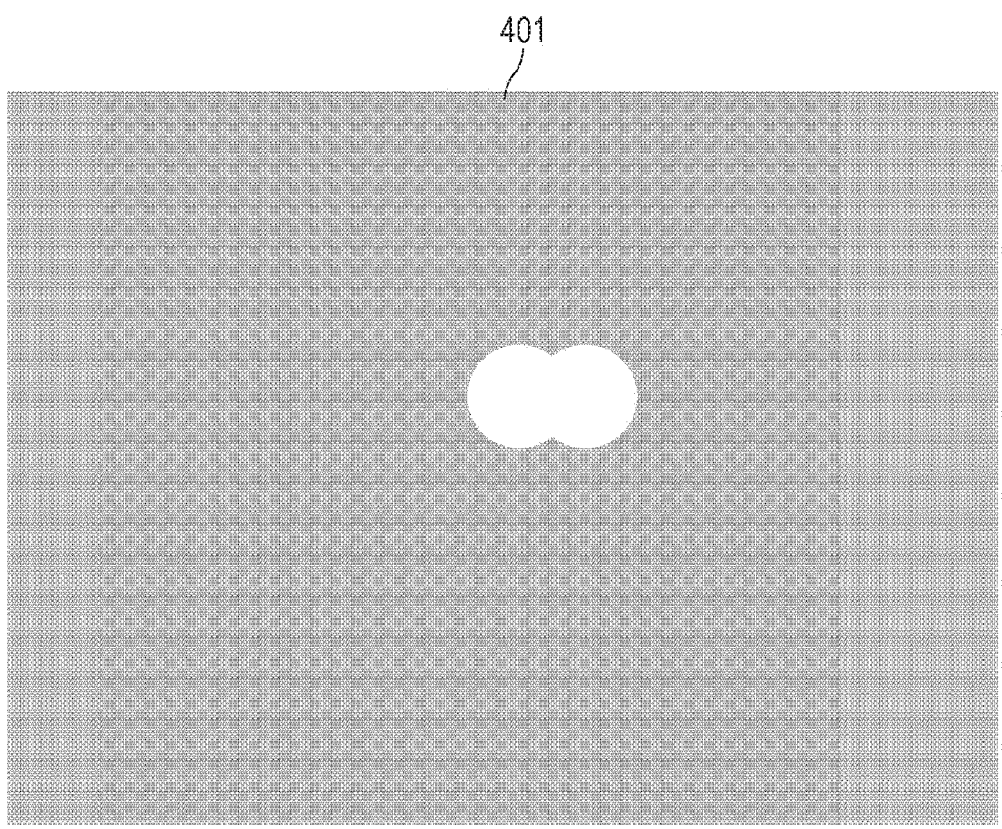
FIG. 4 is a diagram illustrating an image 401 of a scene under dark driving environments shot by the in-vehicle camera at a (long) exposure time for low illumination as illustrated in FIG. 3.

FIG. 4 illustrates an image of the scene under dark driving environments as illustrated in FIG. 3 shot by the in-vehicle camera at a (long) light exposure time for low illumination. Since the headlights of the following vehicle 301 are of high illumination, overexposure is caused to saturate even peripheral pixels in white as indicated with reference number 401. In this case, it is difficult to catch the headlights as two luminous points. When the normal automatic light exposure control is applied to the in-vehicle camera, the in-vehicle camera tends to shoot at a (long) light exposure time for low illumination, and as a result, overexposure as illustrated in FIG. 4 is likely to occur.

Figure 5:
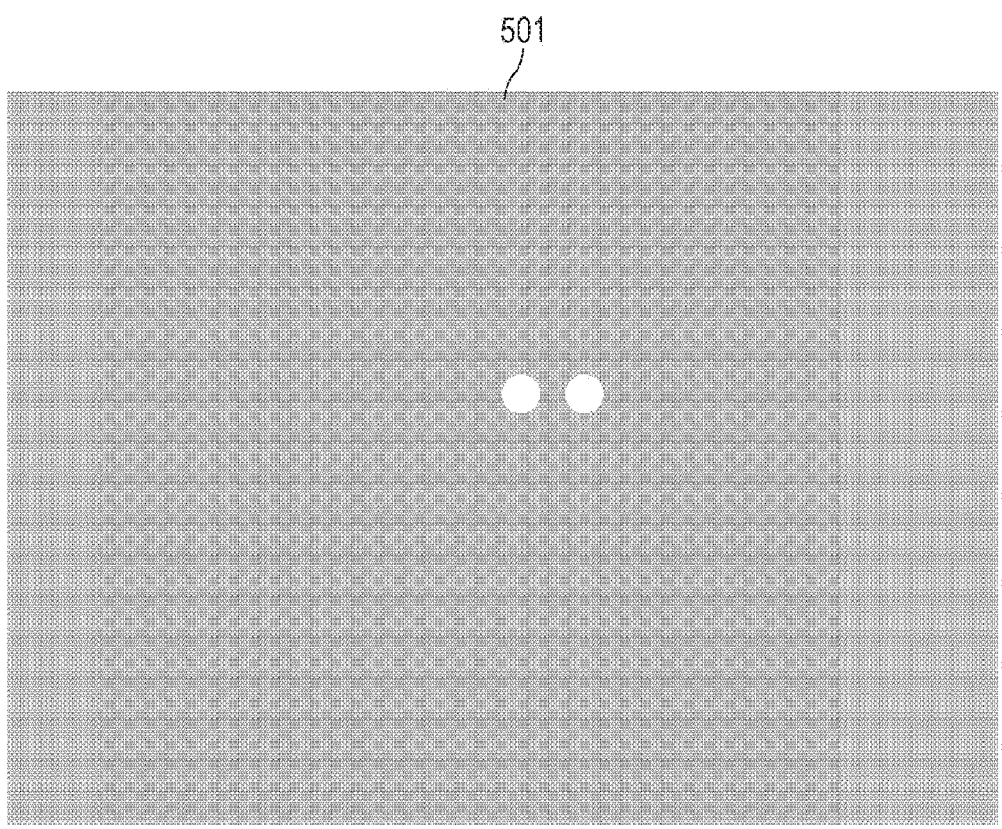
FIG. 5 is a diagram illustrating an image 501 of a scene under dark driving environments shot by the in-vehicle camera at a (short) exposure time for high illumination as illustrated in FIG. 3.

FIG. 5 illustrates an image of a scene under dark driving environments as illustrated in FIG. 3 shot by the in-vehicle camera at a (short) exposure time for high illumination. By suppressing the light exposure, it is possible to catch the right and left high-illumination headlights of the following vehicle 301 as two luminous points as indicated with reference sign 501.

Figure 34:
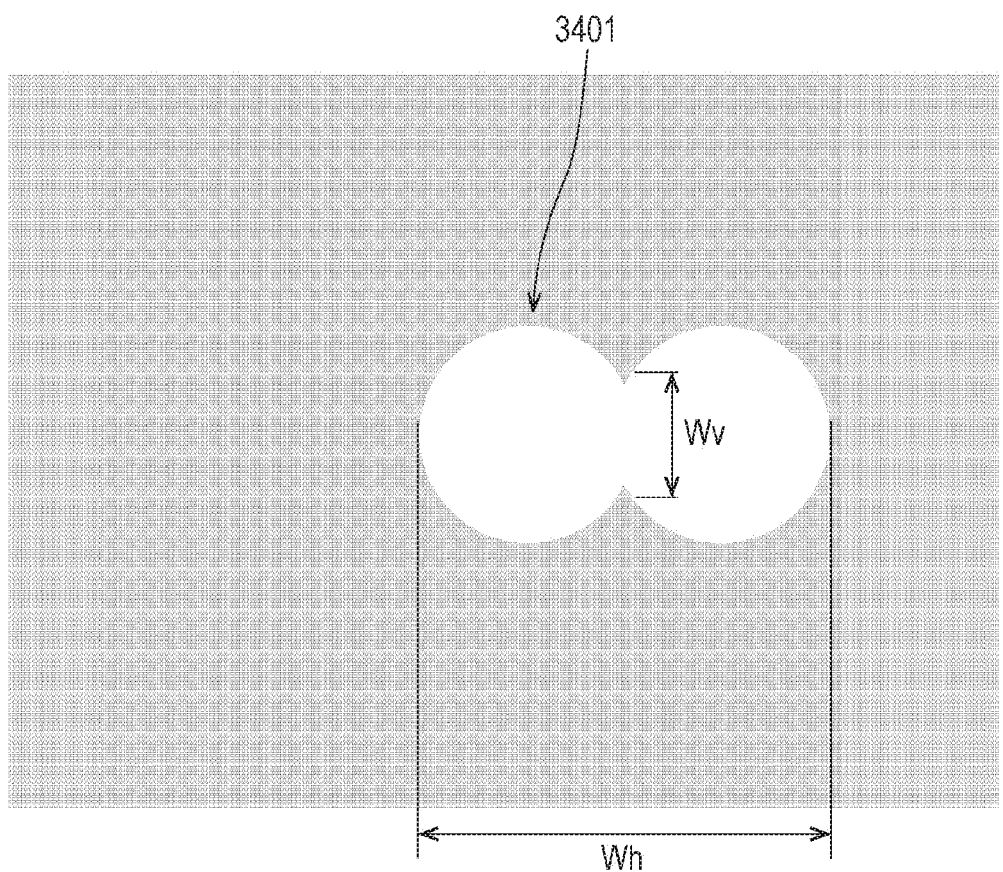
FIG. 34 is a diagram illustrating a headlight shape 3401 when a following vehicle or an oncoming vehicle is shot by the in-vehicle camera in the scene under dark driving environments.

As illustrated in FIG. 34, when a following vehicle or an oncoming vehicle is shot by the in-vehicle camera under dark driving environments, the lateral width of a headlight shape 3401 is designated as Wh, the average of lateral brightness values of the headlights as Yh, the narrowest vertical width of the headlight shape 3401 as Wv, and the average of brightness values at the narrowest portion as Yv. The applicant of the subject application supposes that Wh·Yh/Wv·Yv becomes about 2 or 3 as expressed by the following mathematical expression (1) (A denotes a constant of about 2 or 3).

[Mathematical Formula 1]

$$\frac{Wh \cdot Yh}{Wv \cdot Yv} > A \tag{1}$$

By controlling the exposure time as described above, the user (driver) can estimate the width of the following vehicle 301 and the distance from the following vehicle 301 from the two luminous points and easily determine whether to change lanes even when the vehicle is equipped with an electronic mirror in which a room mirror or side mirrors are replaced with a display. In addition, by applying the foregoing exposure control to the front camera 101, it is possible to determine the width of the preceding vehicle 302 or the oncoming vehicle from the two luminous points. With information on the angle of view of the headlights of the following vehicle 301, it is possible to calculate the distance between the subject vehicle and the following vehicle 301 based on the principles of triangulation. It is further possible to calculate the distance from an oncoming vehicle from the two luminous points of the headlights of the oncoming vehicle. The foregoing information can be applied to a headlight control system in which the headlights of the subject vehicle are automatically switched between high beam and low beam according to the distance from the oncoming vehicle, for example.

For example, when being driving on an expressway, the subject vehicle may speedily catch up with a preceding vehicle and be caught by a following vehicle. Accordingly, distant visual field support is important for safe lane change. The in-vehicle camera related to driving support and distant visual field support needs to catch more correctly distant vehicles possibly approaching the subject vehicle. However, under dark driving environments such as at night or in a tunnel, there is a problem that overexposure is likely to occur when the lamps of high-illumination (backlight) surrounding vehicles are shot by the in-vehicle camera as described above. In particular, the proportion of the headlights of the distant vehicle as light sources in the viewing field is small. Accordingly, when the normal automatic light exposure control is applied to perform an average exposure control on the entire screen, overexposure is likely to occur to saturate even peripheral pixels in white, and it is difficult to catch the headlights as two luminous points.

On a general road in town, other vehicles hardly approach the subject vehicle from a long distance. It is thus not necessarily desired to prioritize uniformly visual check of light sources of the distant vehicles. Therefore, switching between exposure control modes is necessary depending on purposes.

The exposure control mode may be determined depending on changes in environmental light sources under driving environments such as urban areas, tunnels, nighttime, roads without street lights, expressways, and dusk, and average vehicle velocity on roads.

Accordingly, exposure control technology for preferably shooting a distant vehicle with high-illumination headlights illuminated by the in-vehicle camera without occurrence of overexposure under dark driving environments such as at night or in a tunnel will be proposed herein. Briefly, the technology disclosed herein enables optimum exposure control by performing a waveform profile analysis of the distant vehicle with headlights illuminated at night within a small frame set in the image shot by the camera to make the headlights of the distant vehicle easy to view.

Figure 6:
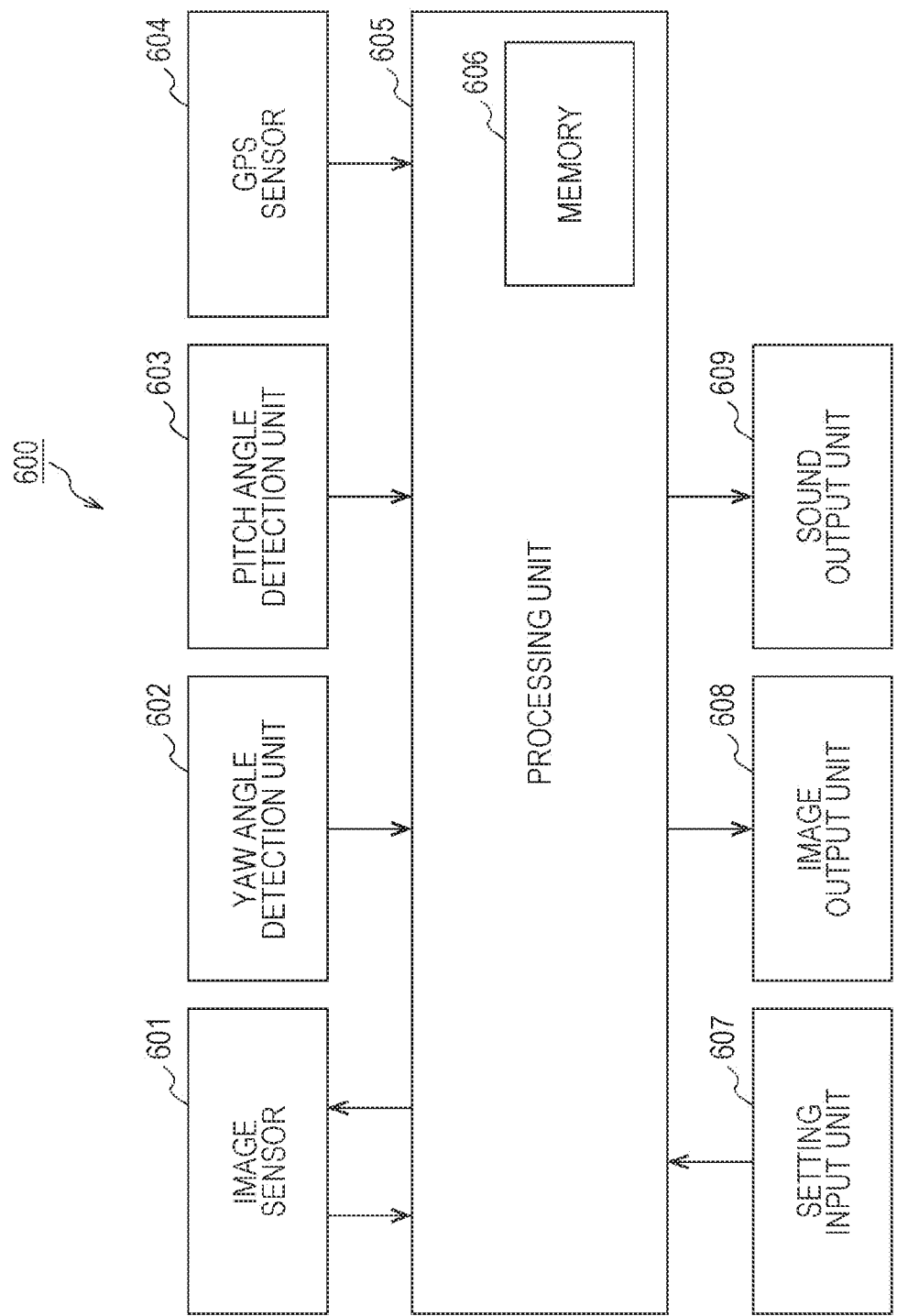
FIG. 6 is a diagram illustrating a configuration example of an in-vehicle camera system 600.

FIG. 6 illustrates schematically a configuration example of an in-vehicle camera system 600 that enables automatic exposure control of the in-vehicle camera.

The target vehicle is equipped with a plurality of sensors such as an image sensor 601, a yaw angle detection unit 602, a pitch angle detection unit 603, and a GPS (global positioning system) sensor 604.

The image sensor 601 is equivalent to an in-vehicle camera mounted in the subject vehicle for the purpose of shooting the surrounding vehicles and others, and is placed at any of the positions illustrated in FIG. 1 or 2, for example. The image sensor 601 may include two or more in-vehicle cameras. Alternatively, the image sensor 601 may be a sensor other than an in-vehicle camera.

The yaw angle detection unit 602 detects the rotational angle θ of the subject vehicle around the yaw. For example, when the subject vehicle is driving around a curve, the yaw angle detection unit 602 detects momentary changes δθ in the rotational angle of the subject vehicle around the yaw equivalent to the turning angle of the road. The yaw angle detection unit 602 is composed of a yaw rate sensor and a rudder angle sensor, for example. The yaw angle θ detected by the yaw angle detection unit 602 is equivalent to the turning angle of the subject vehicle relative to the straight-running direction of the subject vehicle, for example.

The pitch angle detection unit 603 detects the rotational angle φ and the angular velocity of the subject vehicle related to the pitch. For example, when the subject vehicle is driving on an uphill or downhill road, the pitch angle detection unit 603 detects momentary changes δφ in the inclination of the slope. The pitch angle detection unit 603 is composed of a pitch rate sensor and a gyro sensor, for example. The detected pitch angle φ is equivalent to the inclination of the subject vehicle driving on an uphill or downhill road, the inclination of the vehicle body resulting from a freight or the like in the vehicle interior, or the inclination of the vehicle body resulting from an inertial force due to the acceleration or deceleration of the subject vehicle, for example.

The GPS sensor 604 receives radio waves (GPS signals) from overhead GPS satellites. Position determination is performed based on GPS signals from four GPS satellites to determine the receipt time and the receiver coordinates (a point in a three-dimensional space) at the same time (as is well known).

A processing unit 605 includes a memory 606 used as a working area or for storing data and programs in a non-volatile manner to execute various processes. For example, the processing unit 605 executes a process for controlling an automatic exposure in the in-vehicle camera. The processing unit 605 also performs processes for recording a driving history of the subject vehicle, determining the driving direction, and controlling the mode transition in the automatic exposure control, based on detection signals from the image sensor 601, the yaw angle detection unit 602, the pitch angle detection unit 603, and the GPS sensor 604. The memory 606 includes ROM (read only memory) storing in advance information for use in the automatic exposure control, such as weighting information (described later) and various setting values.

A setting input unit 607 is composed of a touch panel or operators such as buttons or switches, for example, to accept input operations from the user (for example, the driver of the subject vehicle) for executing the processes with the processing unit 605. The user can make settings for mode transition in the automatic exposure control of the in-vehicle camera via the setting input unit 607.

An image output unit 608 and a sound output unit 609 output the results of execution of the processes by the processing unit 605 by an image or a sound, respectively. The image output unit 608 has a monitor screen observable from the driver's seat of the subject vehicle, for example, to notify visually a mode shift in the automatic exposure control of the in-vehicle camera and display the results of detection of a distant vehicle. The sound output unit 609 is composed of a speaker, for example, to notify by a sound a mode shift in the automatic exposure control of the in-vehicle camera and the results of detection of a distant vehicle.

Figure 7:
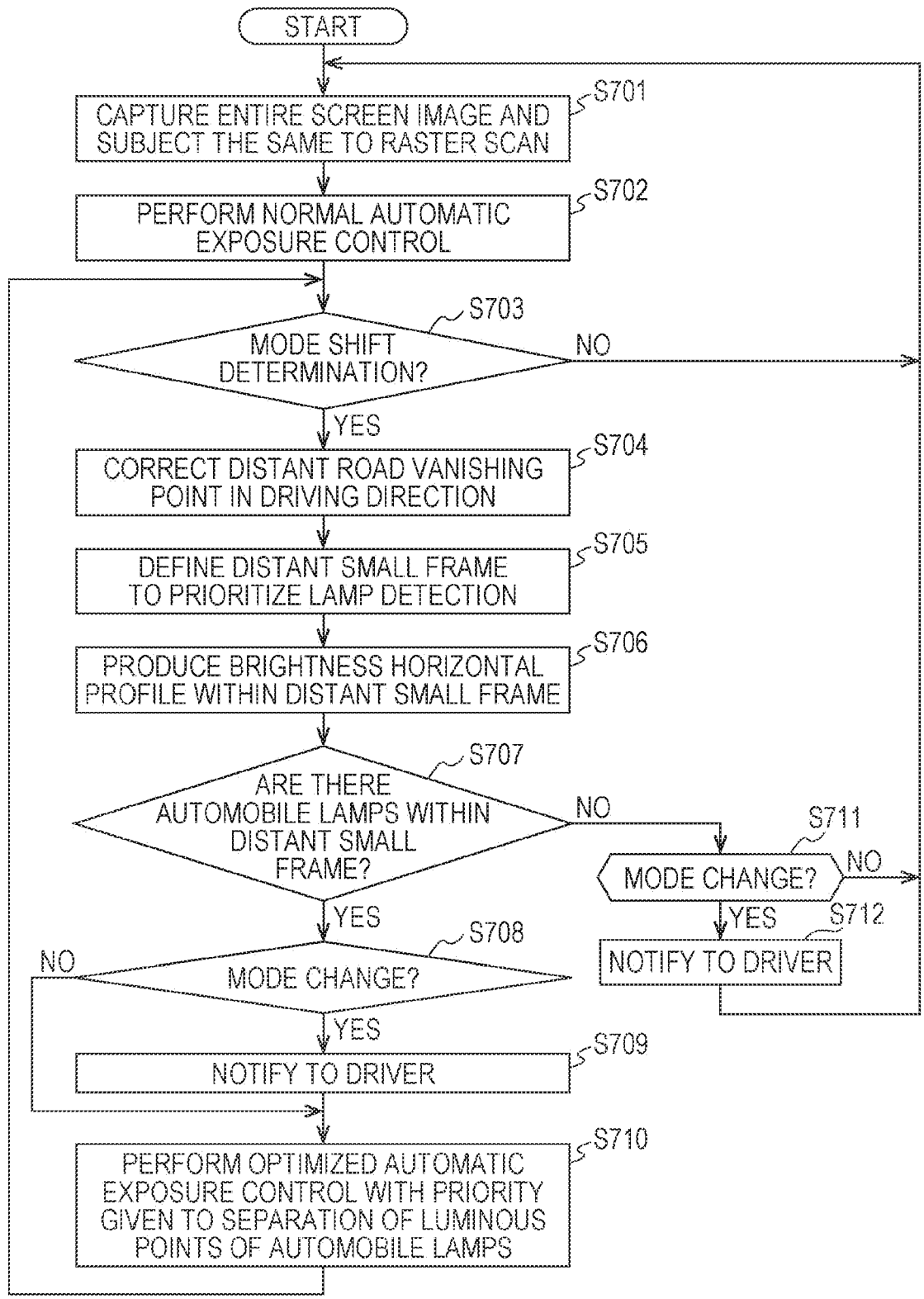
FIG. 7 is a flowchart of a process for automatic exposure control of the in-vehicle camera.

FIG. 7 represents a flowchart of a process for the automatic exposure control of the in-vehicle camera executed by the in-vehicle camera system 600 illustrated in FIG. 6. The automatic exposure control illustrated in the drawing is started by the processing unit 605 when the in-vehicle camera (image sensor 601) is powered on.

First, the processing unit 605 captures an image of the entire screen shot by the in-vehicle camera and subjects the image to raster scanning (step S701).

Next, the processing unit 605 performs a normal automatic exposure control on the in-vehicle camera (step S702). The exposure control technology applied to the normal (or common) photo shooting or in-room video shooting is basically intended to subject the entire screen to average exposure control. For example, there is exposure control method by which the screen is simply divided into a plurality of sections as brightness detection frames, and the sums of incident light in the individual detection frames are integrated to obtain the amount of light, and the exposure of the camera is automatically controlled based on the amount of light (for example, refer to PTL 3).

Next, the processing unit 605 determines whether to shift to a vehicle light source detection mode (step S703). The vehicle light source detection mode here refers to an operation mode in which the presence or absence of the lamps of an automobile (the headlights or taillights of a distant vehicle) is detected under dark driving environments such as at night or in a tunnel. The detection of the vehicle light sources is performed only within a distant small frame described later. To shift to a luminous point separation optimized automatic exposure control mode (described later) that is optimized such that two luminous points of a distant vehicle can be visually separated (or exposure control is performed with priority given to the separation of two luminous points of a distant vehicle), the vehicle light source detection is performed in advance within the distant small frame. The details of a process for determining whether to shift to the vehicle light source detection mode will be described later.

When determining not to shift to the vehicle light source detection mode (step S703: No), the processing unit 605 returns to step S701 to perform continuously the normal automatic exposure control on the in-vehicle camera.

Meanwhile, when determining to shift to the vehicle light source detection mode (step S703: Yes), the processing unit 605 then performs a process for correcting a distant road vanishing point in the driving direction of the subject vehicle within the image shot by the in-vehicle camera (step S704).

Figure 8:
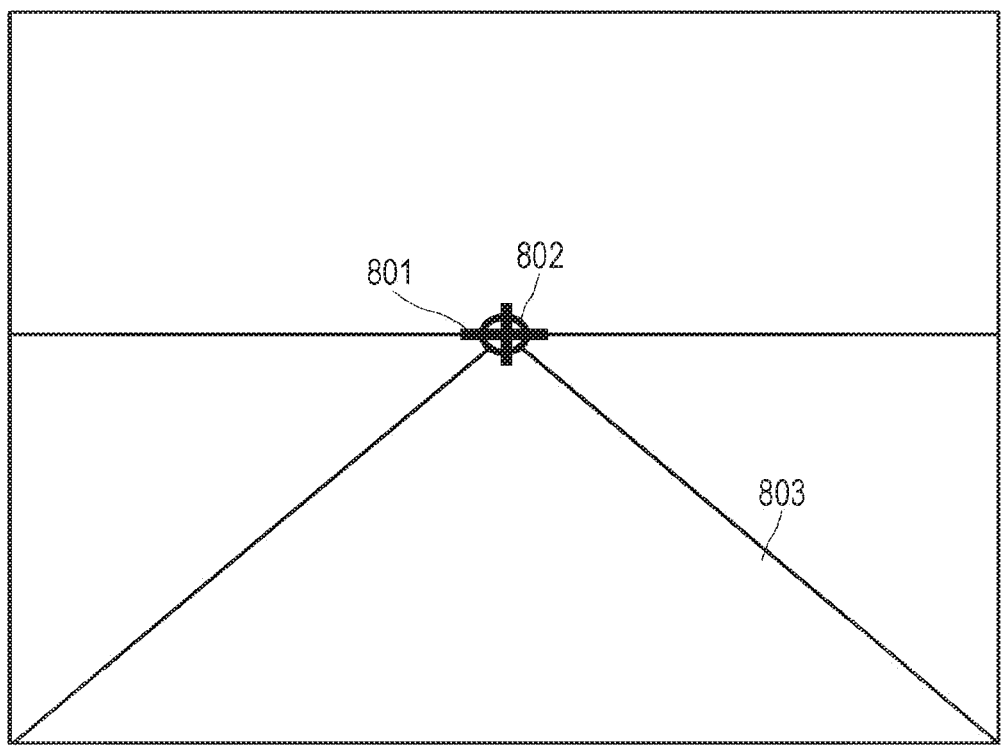
FIG. 8 is a diagram for describing a positional relationship between a distant road vanishing point and a reference point in the driving direction of the vehicle.

The vanishing point refers to a point on which straight lines converge in an image corresponding to parallel lines in a three-dimensional space that are projected onto the image by perspective transformation (for example, refer to PTL 4). The vanishing point is a theoretical distant point at infinity. The term "vanishing point" may recall two kinds of points: a vanishing point in an image shot by the in-vehicle camera (distant point at infinity) and a vanishing point at which ridge lines of the road cross. For the sake of convenience, the vanishing point (distant point at infinity) in the image shot by the in-vehicle camera will be here called "reference point," and the vanishing point at which the ridge lines of the road cross will be here called "distant road vanishing point in the driving direction" (or simply "vanishing point"). The reference point in the image shot by the in-vehicle camera is a fixed value determined by camera parameters or the like, and is stored in advance in the memory (ROM) 606. FIG. 8 illustrates the relationship between the distant road vanishing point 802 in the driving direction of the subject vehicle and the reference point 801, when shooting the area behind the subject vehicle driving on a straight road by the in-vehicle camera mounted in the subject vehicle. For example, to shoot the area behind the subject vehicle driving on a straight road by the in-vehicle camera mounted in the subject vehicle, in the image captured by the camera with an optical axis parallel to the road as illustrated in FIG. 8 in the driving direction of the vehicle, there occurs an overlap between the vanishing point (distant point at infinity) in the image shot by the in-vehicle camera and a road parallel infinite distance at which the ridge lines of a driving road 803 cross at a distance, and the vanishing points almost coincide with each other. However, depending on the position and angle at which the in-vehicle camera is attached to the subject vehicle, the reference point 801 and the distant road vanishing point 802 in the driving direction are shifted from each other in some degree.

Figure 9:
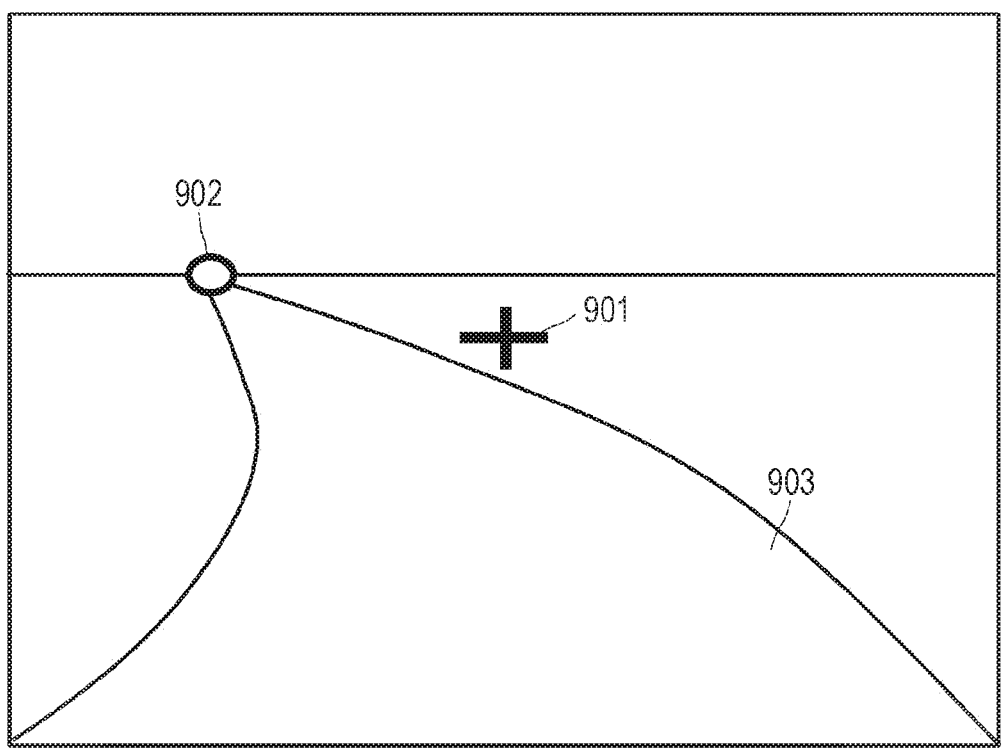
FIG. 9 is a diagram for describing a positional relationship between a distant road vanishing point and a reference point in the driving direction of the vehicle.

As illustrated in FIG. 9, when the area behind the subject vehicle is shot by the in-vehicle camera mounted in the subject vehicle at the time of passage through a right-hand curve road 903, a distant road vanishing point 902 in the driving direction is shifted leftward with respect to a reference point 901 (or when the area ahead of the subject vehicle is shot by the in-vehicle camera at the time of passage through a left-hand curve, a distant road vanishing point in the driving direction is also shifted leftward with respect to a reference point).

Figure 10:
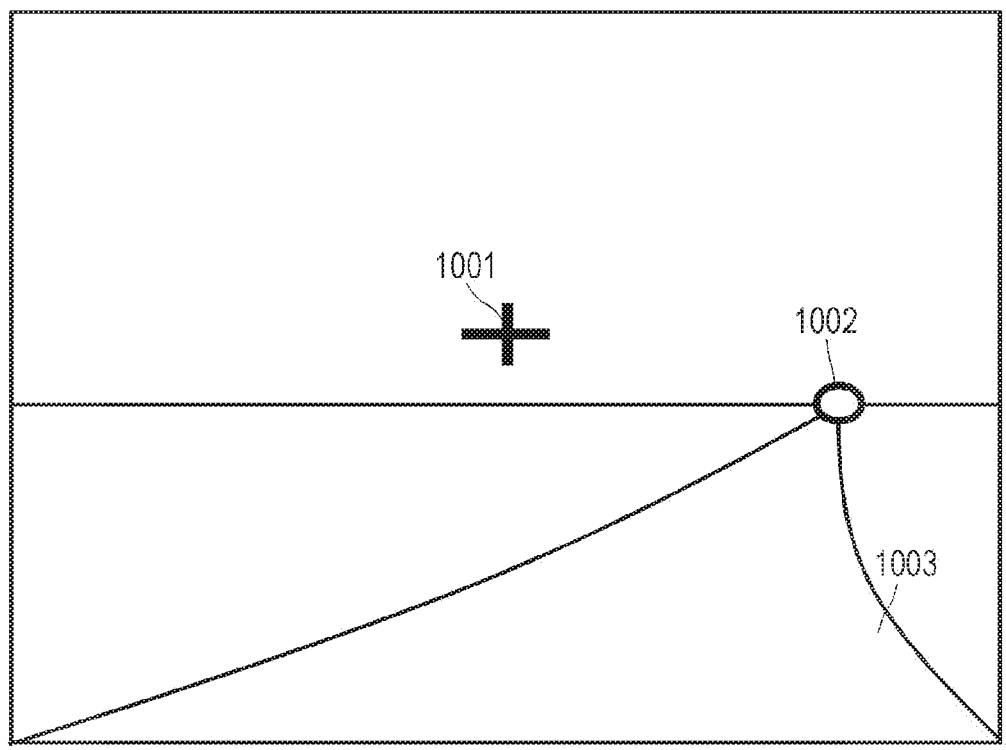
FIG. 10 is a diagram for describing a positional relationship between a distant road vanishing point and a reference point in the driving direction of the vehicle.

In contrast, when the area behind the subject vehicle is shot by the in-vehicle camera mounted in the subject vehicle at the time of passage through a left-hand curve road 1003, a distant road vanishing point 1002 in the driving direction is shifted rightward with reference to the reference point 1001 (or when the area ahead of the subject vehicle is shot by the in-vehicle camera mounted in the subject vehicle at the time of passage through a left-hand curve road 1003, a distant road vanishing point in the driving direction is also shifted rightward with respect to a reference point) as illustrated in FIG. 10.

The processing unit 605 can detect to what degree the road on which the subject vehicle is driving have curved leftward or rightward, based on a driving history including the yaw angle information detected by the yaw angle detection unit 602. Otherwise, the processing unit 605 can predict to what degree the road on which the subject vehicle is driving will curve leftward or rightward from now on, based on current position information and map information obtained by the GPS sensor 604.

Figure 11:
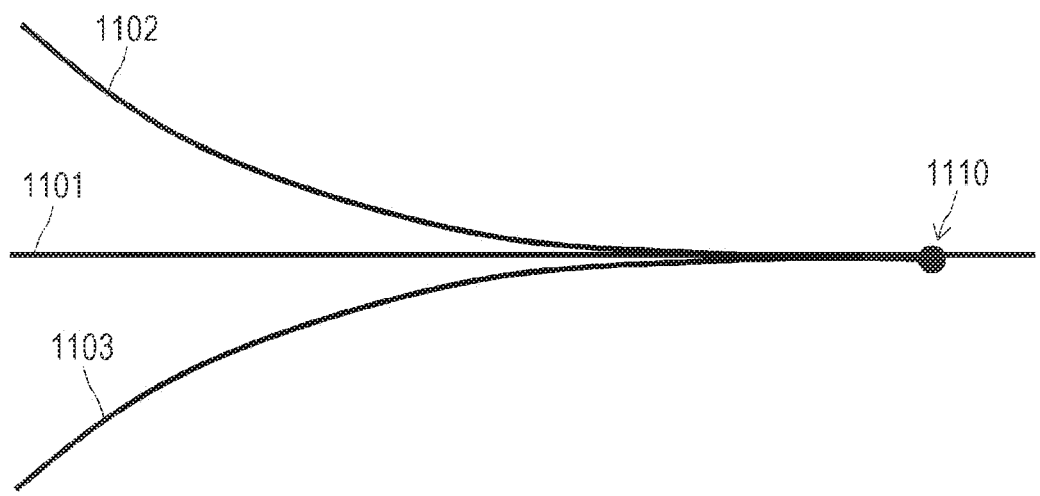
FIG. 11 is a diagram for describing a positional relationship between a distant road vanishing point and a reference point in the driving direction of the vehicle.

When there is a change in the inclination of the road on which the subject driving is driving, the distant road vanishing point in the driving direction may be shifted vertically with respect to the reference point. FIG. 11 illustrates a profile of the road on which the subject vehicle is driving (the left-to-right direction in the drawing is the driving direction of the subject vehicle). Reference number 1101 indicates a profile of a flat (or uniformly inclined) road, reference number 1102 indicates a profile of a road with a downhill ended at a spot 1110, and a reference number 1103 denotes a profile of a road with an uphill ended at the spot 1110.

During driving on a flat (or uniformly inclined) road as indicated with reference number 1101, when the area behind the subject vehicle is shot by the in-vehicle camera mounted in the subject vehicle, the distant road vanishing point in the driving direction almost coincides with the vanishing point (distant point at infinity) in the image shot by the in-vehicle camera as illustrated in FIG. 8.

Figure 12:
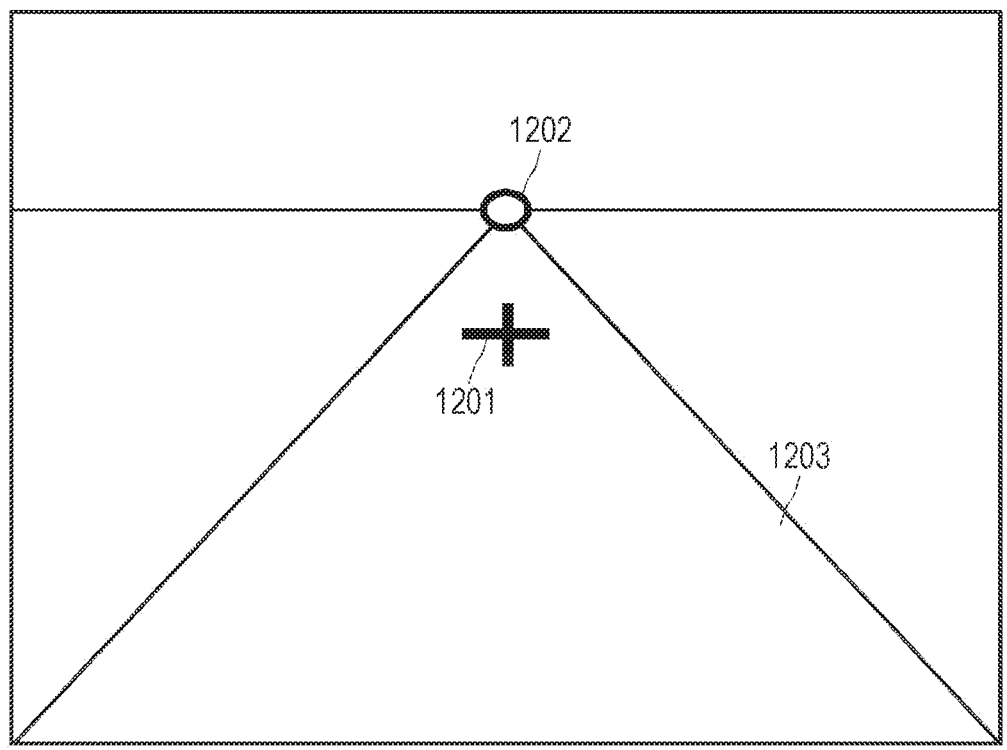
FIG. 12 is a diagram for describing a positional relationship between a distant road vanishing point and a reference point in the driving direction of the vehicle.

Meanwhile, when the area at the back side of a road 1203 is shot by the in-vehicle camera mounted in the subject vehicle at the spot 1110 at the end of the downhill as indicated with reference number 1102, the distant road vanishing point 1202 in the driving direction is shifted upward with reference to a reference point 1201 as illustrated in FIG. 12 (or when the area at the front side of the road 1203 is shot by the in-vehicle camera at the beginning of an uphill, a distant road vanishing point in the driving direction is also shifted upward with reference to a reference point).

Figure 13:
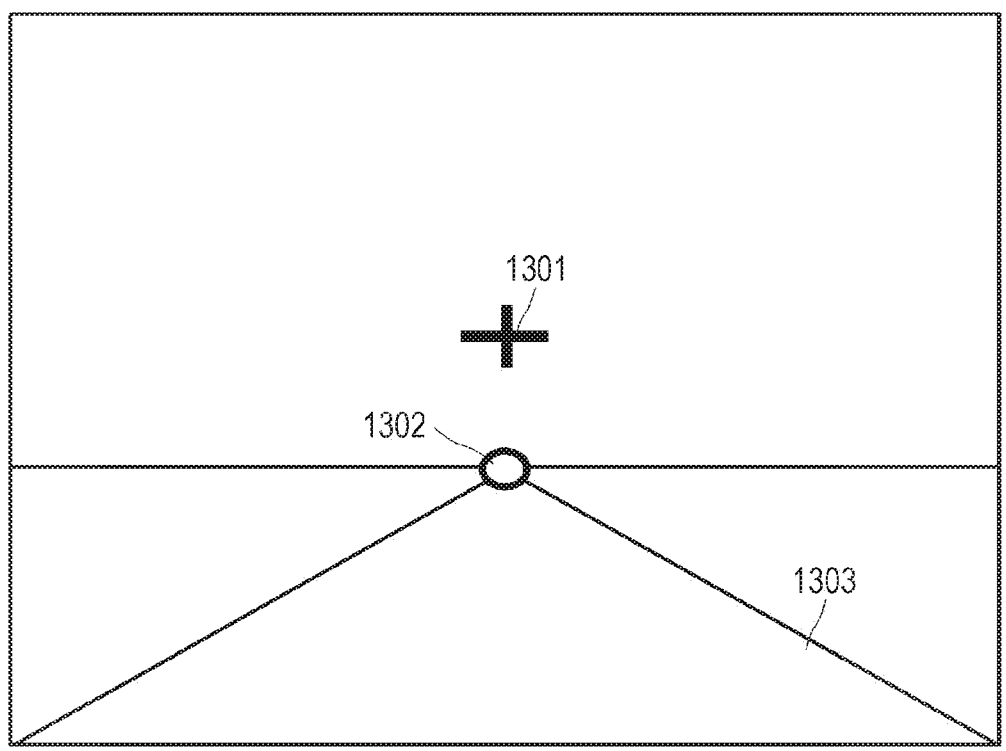
FIG. 13 is a diagram for describing a positional relationship between a distant road vanishing point and a reference point in the driving direction of the vehicle.

When the area at the back side of a road 1303 is shot by the in-vehicle camera mounted in the subject vehicle at the spot 1110 at the end of the uphill as indicated with reference number 1103, as illustrated in FIG. 13, a distant road vanishing point 1302 in the driving direction is shifted downward with respect to a reference point 1301 (or when the area at the front side of a road is shot by the in-vehicle camera at the beginning of a downhill, a distant road vanishing point in the driving direction is also shifted downward with reference to a reference point).

As a summary of the descriptions in FIGS. 8 to 13, in the area behind the subject vehicle, the distant road vanishing point is corrected based on the direction of the driving path of the subject vehicle, and in the area ahead of the subject vehicle, the distant road vanishing point is corrected based on the predicted driving direction of the subject vehicle (the road surface direction along the road on which the subject vehicle is driving).

The processing unit 605 can detect changes in the inclination of the road on which the subject vehicle has driven based on a driving history including the pitch angle information detected by the pitch angle detection unit 603. Otherwise, the processing unit 605 can predict that an uphill or a downhill starts on the road on which the subject vehicle is driving, based on the current position information and the map information obtained by the GPS sensor 604.

Therefore, at step S704, the processing unit 605 decides the distant road vanishing point in the driving direction of the subject vehicle, based on the attachment position and attachment angle of the in-vehicle camera and the driving history (changes in the driving direction of the subject vehicle obtained by the yaw angle detection unit 602, the inclination of the subject vehicle obtained by the pitch angle detection unit 603, and the current position information obtained by the GPS sensor 604) (that is, the processing unit 605 corrects the position of the distant road vanishing point based on the reference point).

Next, the processing unit 605 defines a distant small frame to prioritize the detection of the lamps of an automobile (the illuminated headlights or taillights of a distant vehicle) on the screen after the correction of the distant road vanishing point (step S705).

For example, the in-vehicle camera related to a distant viewing field support on an expressway needs to catch a distant vehicle possibly approaching the subject vehicle in a more correct manner. However, the proportion of the headlights of the distant vehicle as light sources in the field of view is small, and the application of the normal automatic exposure control would easily cause overexposure. This is because the distant small frame is defined to prioritize the detection of lamps.

It is presumed that the distant vehicle possibly approaching the subject vehicle is driving in the direction of the driving path of the subject vehicle in the area behind the subject vehicle, or is driving in the predicted driving direction of the subject vehicle (the road surface direction along the road on which the subject vehicle is driving) in the area ahead of the subject vehicle. Therefore, it is expected that, by defining the distant small frame with respect to the distant road vanishing point in the driving direction of the subject vehicle, the desired distant vehicle can be caught within the distant small frame.

Figure 14:
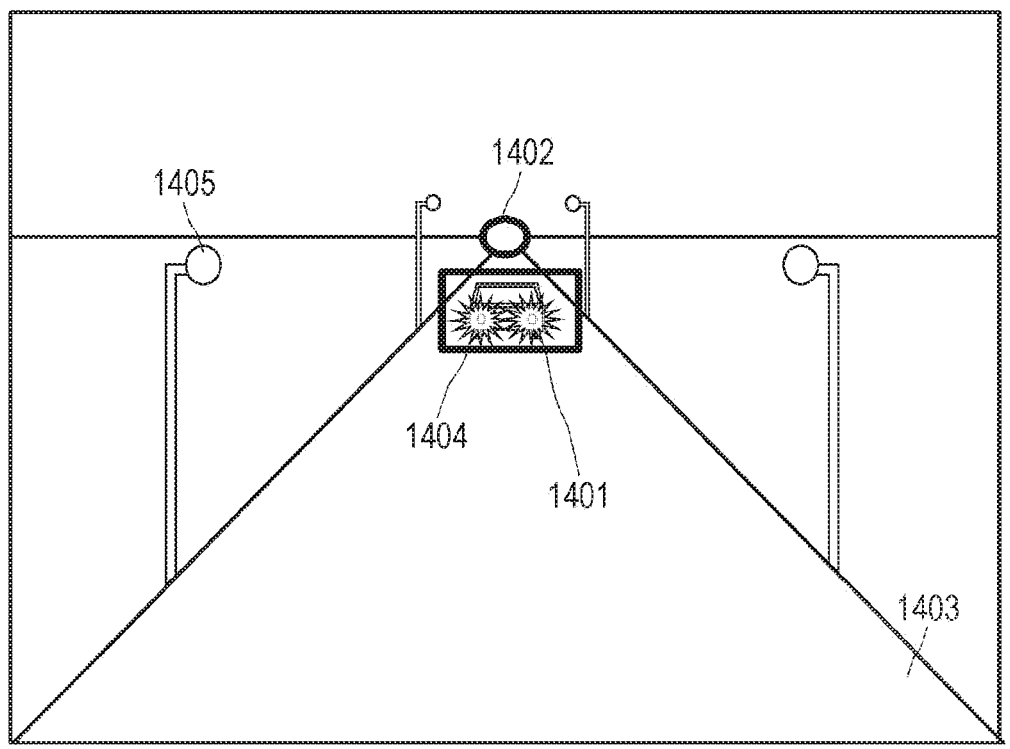
FIG. 14 is a diagram illustrating an example in which a distant small frame is defined based on a distant road vanishing point in the driving direction of a subject vehicle.

At step S705, the distant small frame is defined based on the distant road vanishing point corrected at previous step S704. FIG. 14 illustrates an example in which a distant small frame 1401 is defined with respect to a distant road vanishing point 1402 in the image shot by the in-vehicle camera. The lamps (the illuminated headlights or taillights of a distant vehicle) are detected only within the distant small frame because the proportion of the headlights or taillights of the distant vehicles as light sources in the field of view of the in-vehicle camera is small. The distant small frame 1401 is basically set at or near a position under the distant road vanishing point 1402, for the obvious reason that a distant vehicle 1404 is driving on the road surface under the distant road vanishing point in the shot image. Further, this is also because the streetlights are generally supposed to be located higher than the camera in the subject vehicle and positioned above the distant vanishing point in the shot image, and thus the streetlights are to be excluded from the frame. In addition, by narrowing down the position and size of the distant small frame 1401 to the neighborhood of the distant road vanishing point 1402 as described above, it is possible to exclude light sources other than the vehicles, such that streetlights 1405 at both sides of a road 1403, from the detection target.

The size and shape (rectangular, trapezoid, or the like) of the distant small frame may be pre-defined. In the following description, the size and shape of the pre-defined distant small frame are recorded in advance in the memory (ROM) 606. Alternatively, the position, size, and shape of the distant small frame may be changed depending on the position of the distant road vanishing point because the distant road vanishing point moves from the reference point due to curves or undulations in the road on which the subject vehicle is driving (refer to the foregoing descriptions and see FIGS. 8 to 13). The details of a process for defining the distant small frame performed in step S705 will be described later.

Next, the processing unit 605 produces a brightness horizontal profile within the distant small frame defined at previous step S705 (step S706). Specifically, based on the sum (or average) of brightness values of the pixels in the scan line direction in the distant small frame, weights in individual scan lines are decided, and the brightness values of the pixels in the scan direction are smoothed out by adding the weights in the individual scan lines at individual horizontal pixel positions within the distant small frame, thereby producing a brightness horizontal profile within the distant small frame.

Figure 15:
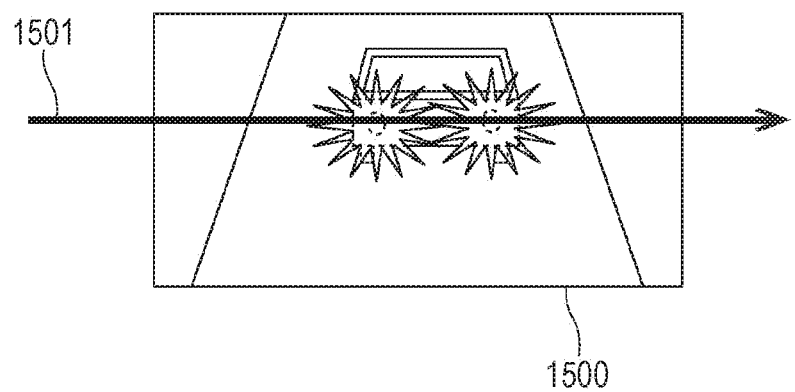
FIG. 15 is a diagram illustrating a scan line 1501 at one vertical pixel position v within a distant small frame 1500.
Figure 16:
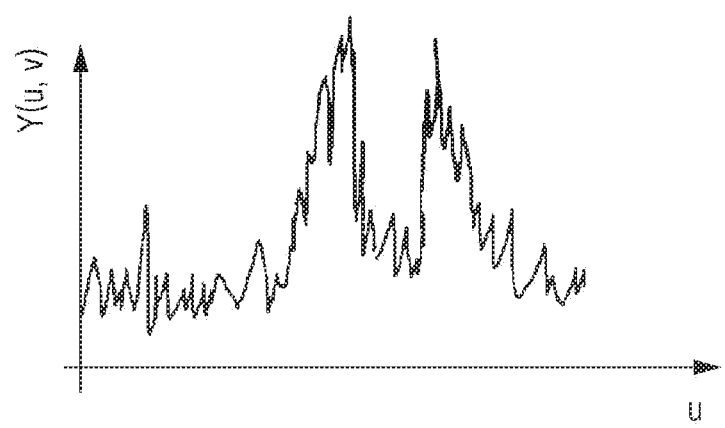
FIG. 16 is a diagram illustrating a brightness distribution on one scan line (horizontal direction) within a distant small frame.
Figure 17:
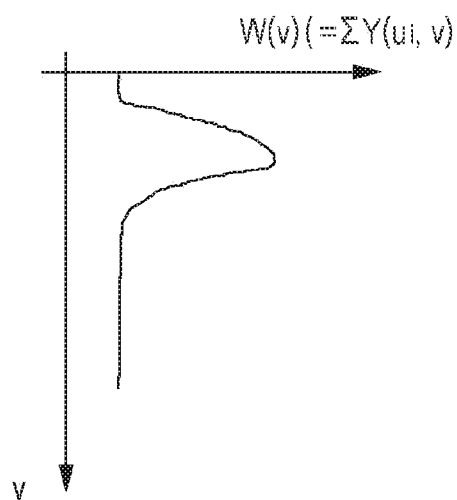
FIG. 17 is a diagram illustrating weights in individual scan lines (vertical direction).
Figure 18:
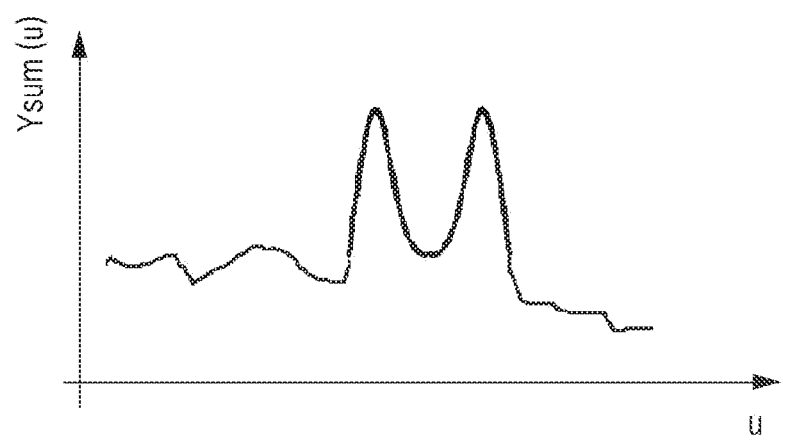
FIG. 18 is a diagram illustrating a brightness horizontal profile within a distant small frame.

FIG. 15 illustrates a scan line 1501 at one vertical pixel position v within a distant small frame 1500. FIG. 16 illustrates a horizontal brightness distribution within the scan line 1501 at the vertical pixel position v. In FIG. 16, the transverse axis indicates horizontal pixel position u within the distant small frame, and the longitudinal axis indicates brightness value Y(u, v) at each horizontal pixel position u. FIG. 17 illustrates weights in individual scan lines (v) (vertical direction) obtained by summing up the brightness values of the pixels at the same horizontal position within the distant small frame. In FIG. 17, the longitudinal axis indicates the scan position (vertical pixel position v) within the distant small frame, and the transverse axis indicates weight W(v) (resulting from the sum of the brightness values of the pixels) at each scan position (=ΣY(ui, v)). As illustrated in FIG. 15, when a distant vehicle with illuminated headlights is included in the distant small frame, it is predicted that the sum of the brightness values, that is, the weight becomes larger near the scan position of the headlights. FIG. 18 illustrates a brightness horizontal profile within the distant small frame obtained by adding the weights in the individual scan lines to the brightness values of the pixels in the scan direction at the individual horizontal pixel positions (u) within the distant small frame. In FIG. 18, the transverse axis indicates the horizontal pixel position u within the distant small frame, and the longitudinal axis indicates weighted brightness sum value Ysum(u) obtained by weighting the brightness values of the pixels at the horizontal pixel position u. The detailed process for producing the brightness horizontal profile within the distant small frame performed at step S706 will be described later.

Then, the processing unit 605 checks whether there are the lamps of an automobile (that is, the headlights of a distant oncoming vehicle (or following vehicle) or the tail lights of a preceding vehicle) within the distant small frame defined at previous step S705 (step S707) based on the brightness horizontal profile produced at the previous step S706. As illustrated in FIG. 15, in the distant small frame 1500 including two luminous points (the headlights of a distant vehicle), it is presumed that a brightness horizontal profile having two peaks (maximum points) is produced as illustrated in FIG. 18. The detailed procedure of a process for checking the presence or absence of the lamps of an automobile within the distant small frame performed at step S707 will be described later.

When there are no lamps of an automobile within the distant small frame (step S707: No), the processing unit 605 returns to step S701 to perform a normal automatic exposure control on the in-vehicle camera. However, the in-vehicle camera has already shifted to the luminous point separation optimized automatic exposure control mode (described later). To change to the normal automatic exposure control mode (step S711: Yes), the driver of the subject vehicle is notified in advance of the mode change through the image output unit 608 or the sound output unit 609 (step S712).

When there are the lamps of an automobile within the distant small frame (step S707: Yes), the processing unit 605 optimizes the automatic exposure control on the in-vehicle camera such that the two luminous points (the right and left headlights of an oncoming vehicle (or following vehicle), or the right and left taillights of a preceding vehicle) can be separated in the luminous point separation optimized automatic exposure control mode (step S710). However, to change from the normal automatic exposure control mode to the luminous point separation optimized automatic exposure control mode (step S708: Yes), the driver of the subject vehicle is notified in advance of the mode change through the image output unit 608 or the sound output unit 609 (step S709).

The exposure control modes are not necessarily limited to the normal automatic exposure control mode and the luminous point separation optimized automatic exposure control mode, but may include an intermediate mode. For example, exposure control×α in the normal automatic exposure control mode and exposure control×β in the luminous point separation optimized automatic exposure control mode may be performed (α+β=1) such that α and β are controlled depending on road environments and outside light source environments.

In this embodiment, it is determined at step S707 whether there are the lamps of an automobile within the distant small frame, and then the exposure control is performed at step S710. Alternatively, in reverse, the exposure control may be performed, and then the presence or absence of the lamps of an automobile within the distant small frame determined.

Figure 19:
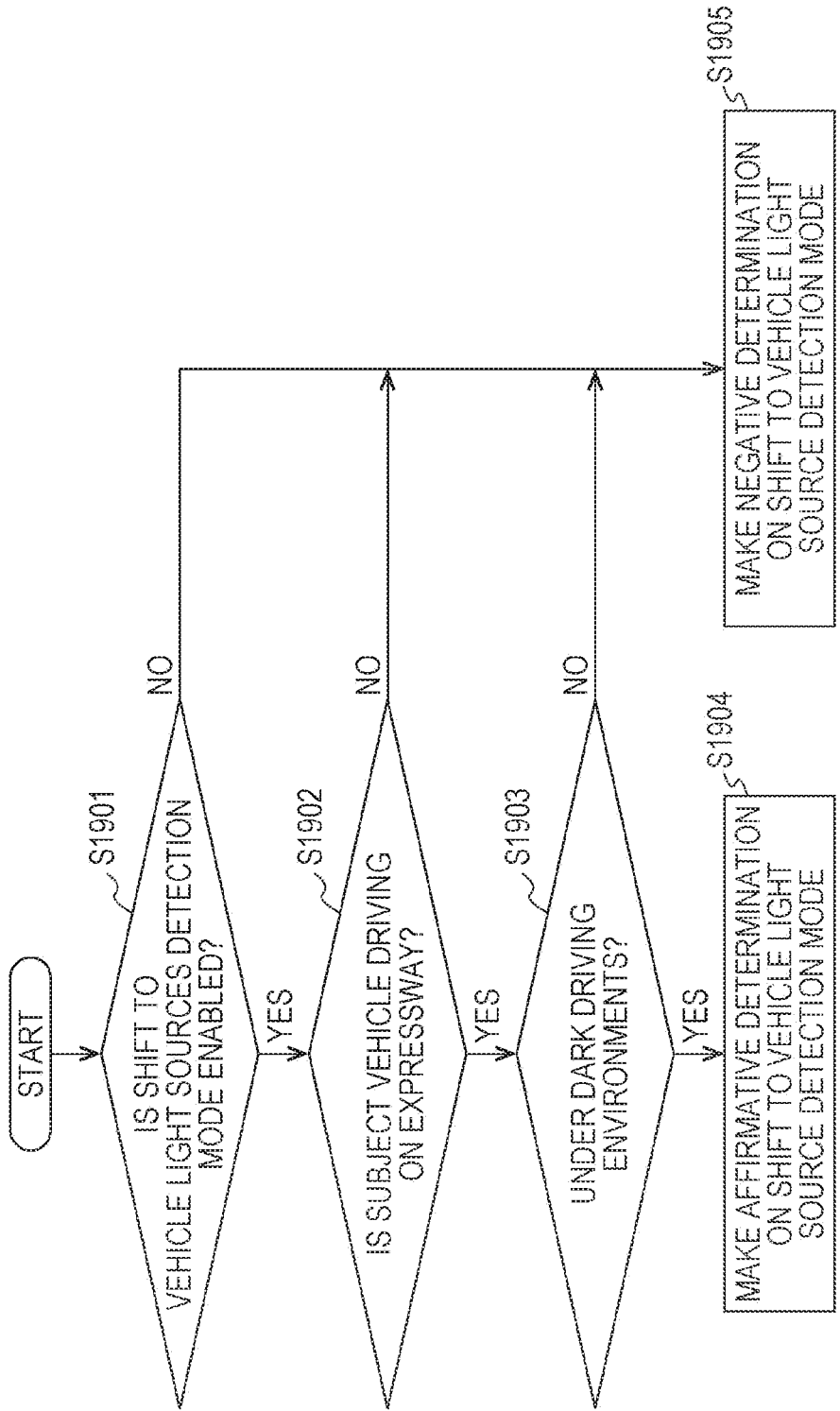
FIG. 19 is a flowchart of a process for determining whether to shift to a vehicle light source detection mode.

FIG. 19 indicates a flowchart of a process for determining whether to shift to the vehicle light source detection mode performed at step S703 of the flowchart illustrated in FIG. 7.

First, the processing unit 605 checks whether the shift to the vehicle light source detection mode is enabled (step S1901). The user (for example, the driver of the subject vehicle) is allowed to make a mode setting through the setting input unit 607, and perform the determination process depending on the setting conditions and others. When the shift to the vehicle light source detection mode is not enabled (step S1901: No), the processing unit 605 returns the negative result of determination on the shift to the vehicle light source detection mode (step S1905).

When it is not necessary to detect the lamps of a distant vehicle from the image shot by the in-vehicle camera, the driver may disable the shift to the vehicle light source detection through the image sensor 601 such that the normal automatic exposure control is continuously applied to the in-vehicle camera. For example, to shoot not only the distant vehicle but also the entire scenery by the in-vehicle camera, the driver may disable the shift to the vehicle light source detection.

When the shift to the vehicle light source detection mode is enabled (step S1901: Yes), the processing unit 605 further checks whether the subject vehicle is currently driving on an expressway (step S1902).

The processing unit 605 can check whether the subject vehicle is currently driving on an expressway based on the position information obtained by the GPS sensor 604. Alternatively, the processing unit 605 may determine whether the road on which the subject vehicle is driving is an expressway through analysis of the image shot by the image sensor 601. Alternatively, the processing unit 605 may determine whether the subject vehicle is currently driving on an expressway based on whether the subject vehicle is charged for an expressway toll by an ETC (electronic toll collection system) (for example, the subject vehicle holds entry information received by an in-vehicle ETC machine at an expressway toll gate antenna).

On an expressway, the subject vehicle and the surrounding vehicles are supposed to drive at high speeds. The expressway is linear or gently curved and can be overlooked.

For example, when the subject vehicle is about to change lanes on an expressway under dark driving environments such as at night or in a tunnel, a distant following vehicle may rapidly approach the subject vehicle or the subject vehicle may rapidly approach a distant preceding vehicle. Accordingly, it is necessary to perform automatic exposure control optimized for vehicle light source detection and separation of luminous points (right and left headlights) of the distant vehicle (or exposure control is performed with priority given to the separation of luminous points of the distant vehicle). In contrast, on a general road or a city road, the subject vehicle and a distant vehicle are highly unlikely to approach rapidly each other. Instead, some caution should be given to vehicles and pedestrians near the subject vehicle. In addition, most of such roads are bent and are not good in visibility. Therefore, there is no need for the automatic exposure control optimized for vehicle light source detection and separation of luminous points of a distant vehicle on roads other than expressways.

When the subject vehicle is not currently driving on an expressway (step S1902: No), it is not necessary to shift to the vehicle light source detection mode. Accordingly, the processing unit 605 returns the negative result of determination on the shift to the vehicle light source detection mode (step S1905).

When the subject vehicle is currently driving on an expressway (step S1902: Yes), the processing unit 605 further checks whether the subject vehicle is currently driving under dark driving environments (step S1903).

For example, the nighttime and the inside of a tunnel can be said to be dark driving environments. The processing unit 605 may determine whether it is night time now based on time information provided by a system clock, for example. Alternatively, the processing unit 605 may determine whether the subject vehicle is driving in a tunnel based on the current position information and the map information obtained by the GPS sensor 604. Alternatively, the processing unit 605 may determine whether the subject vehicle is driving under dark driving environments such as at night or in a tunnel, based on brightness information for the image shot by the image sensor 601.

When the subject vehicle is not driving under dark driving environments (step S1903: No), it is possible to catch accurately a distant vehicle even by the normal exposure control under which the entire screen is subjected to average exposure control. That is, there is no need to shift to the vehicle light source detection mode, and therefore the processing unit 605 returns the negative result of determination on the shift to the vehicle light source detection mode (step S1905).

In contrast, when the shift to the vehicle light source detection mode is enabled and the subject vehicle is determined to be driving under dark driving environments such as at night or in a tunnel (step S1903: Yes), the processing unit 605 returns the affirmative result of determination on the shift to the vehicle light source detection mode (step S1904). When determining to shift to the vehicle light source detection mode through the process shown in FIG. 19, the processing unit 605 performs a process for correcting the distant road vanishing point in the driving direction of the subject vehicle in the image shot by the in-vehicle camera, at next step S704.

It has been already explained with reference to FIGS. 8 to 12 that the distant road vanishing point in the driving direction is to be corrected depending on curves or changes in the inclination of the road on which the subject vehicle is driving. The distant road vanishing point in the driving direction herein refers to a point on which the ridge lines of the road converge. The vanishing point is theoretically a distant point at infinity. The distant road vanishing point can be exactly determined as a point where straight lines extended from optical flows (motion vectors) cross each other in the shot image.

In actuality, while the subject vehicle is about to change lanes on an expressway, it is not necessary to check the presence of a following vehicle at infinity. In the area behind the subject vehicle, the place a predetermined distance L (for example, L=about 150 meters) behind in the direction of driving path of the subject vehicle may be set as an approximate distant road vanishing point. Similarly, in the area ahead of the subject vehicle, the place the predetermined distance L ahead in the predicted driving direction of the subject vehicle (the road surface direction along the road on which the subject vehicle is driving) may be set as an appropriate road vanishing point.

Figure 20:
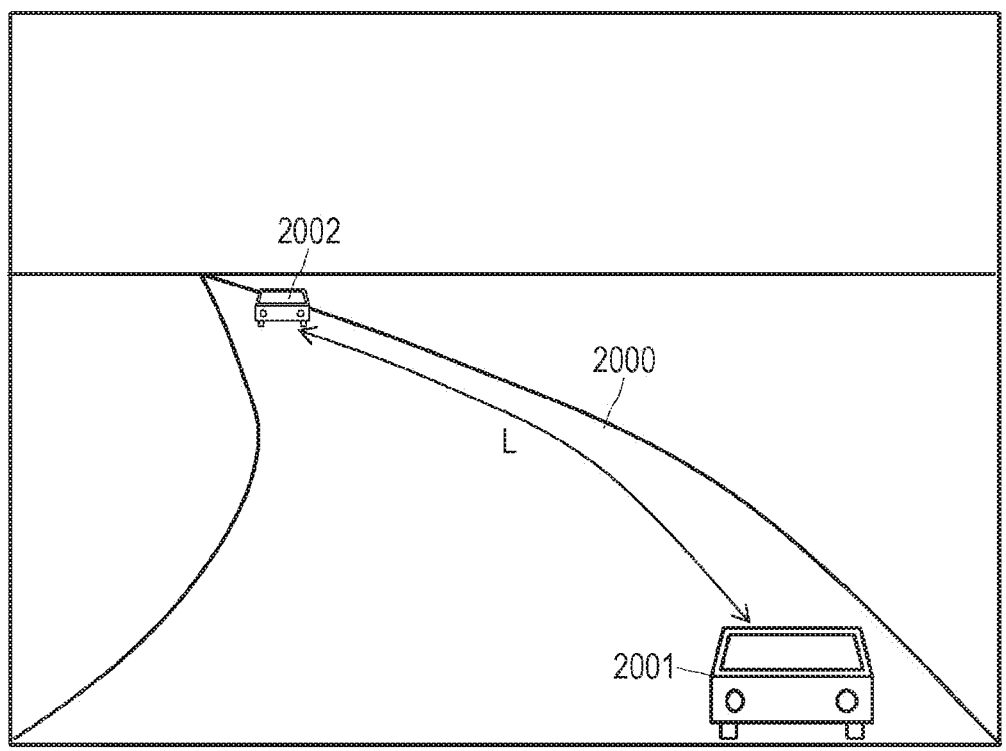
FIG. 20 is a diagram for describing a method for approximating a distant road vanishing point on a curve road.

Referring to FIG. 20, a method for calculating an approximate distant road vanishing point at a vehicle position 2002 the predetermined distance L behind a current subject vehicle position 2001 on an expressway 2000 curving gently to the right will be explained. When the road bends an angle $\delta\theta$ at a spot a distance $\delta I$ behind the current vehicle position 2001, it is possible to calculate an angle $\theta L$ of the bend from the vehicle position 2002 the predetermined distance L behind the subject vehicle by integrating the angles $\delta\theta$ between the current vehicle position 2001 and the vehicle position 2002 the predetermined distance L behind the current vehicle position 2001, and approximate the distant road vanishing point based on the distance L and the angle $\theta L$, as shown by the following mathematical expression (2). The bend angle $\delta\theta$ in the road the distance $\delta I$ behind the subject vehicle can be measured as yaw rate of the subject vehicle by the yaw angle detection unit 602, for example. Alternatively, to approximate the distant road vanishing point in the area ahead of the driving direction, the bend angle $\delta\theta$ in the road the distance $\delta I$ ahead of the subject vehicle may be determined based on the current position information and the map information obtained by the GPS sensor 504.

[Mathematical Formula 2]

$$\theta_L = \int_0^L \frac{\delta\theta_i}{\delta I} \tag{2}$$

Figure 21:
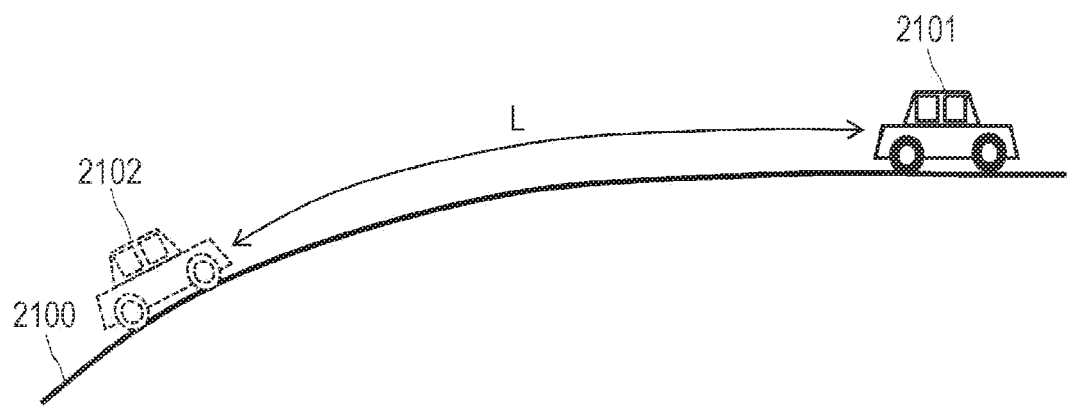
FIG. 21 is a diagram for describing a method for approximating a distant road vanishing point on a road with a change in inclination.

Referring to FIG. 21, a method for calculating the approximate distant road vanishing point at a vehicle position 2102 the predetermined distance L behind a current subject vehicle position 2101 at a spot at the end of an uphill 2100 will be explained. When a change in the inclination angle of the road at a spot the distance $\delta I$ behind the current vehicle position 2101 is designated as $\delta\phi$, it is possible to calculate an inclination angle $\phi L$ from the vehicle position 2102 the predetermined distance L behind the subject vehicle by integrating the changes $\delta\phi$ in the inclination angle between the current vehicle position 2101 and the vehicle position 2102 the predetermined distance L behind the current vehicle position 2101, and approximate the distant road vanishing point based on the distance L and the inclination angle $\phi L$, as shown by the following mathematical expression (3). The change $\delta\phi$ in the inclination angle of the road the distance $\delta I$ behind the subject vehicle can be measured as pitch rate of the subject vehicle by the pitch angle detection unit 603, for example.

[Mathematical Formula 3]

$$\phi_L = \int_\theta^L \frac{\delta \phi_l}{\delta l} \quad (3)$$

Figure 22:
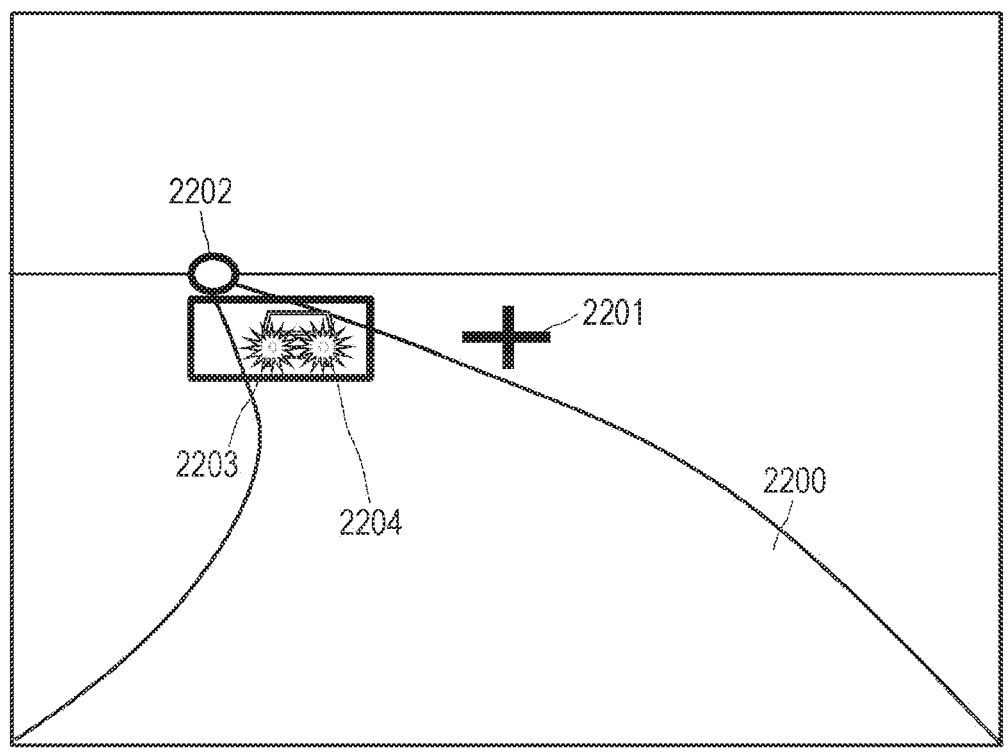
FIG. 22 is a diagram illustrating an example in which a distant small frame is defined based on a distant road vanishing point in the driving direction of the subject vehicle.
Figure 23:
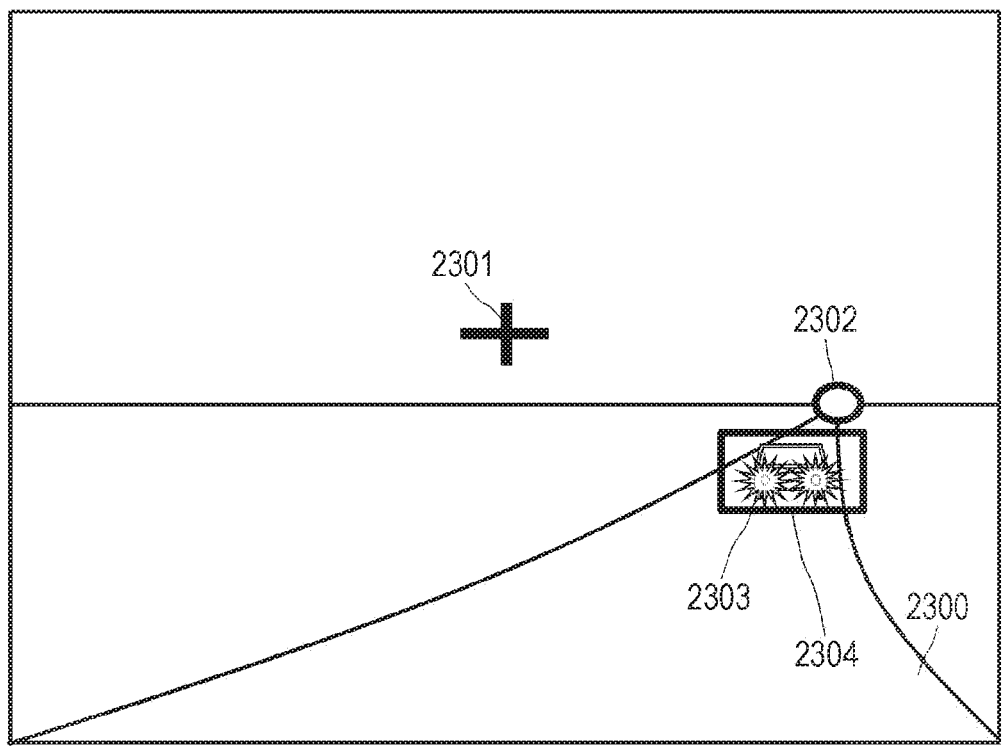
FIG. 23 is a diagram illustrating an example in which a distant small frame is defined based on a distant road vanishing point in the driving direction of the subject vehicle.

The processing unit 605 defines a distant small frame for detecting vehicle light sources (lamps of a vehicle) based on the corrected distant road vanishing point at next step S705. FIG. 14 illustrates an example in which the distant small frame is defined in the simplest case, that is, the distant small frame is defined in the area behind the subject vehicle in the driving direction on a straight road. FIGS. 22 and 23 illustrate other examples of defining the distant small frame. The image height of a camera varies depending on its optical projection system. However, as far as it is not a wide-angle camera, the camera performs pinhole projection as central projection in many cases, and the angle of the camera is determined according to the image height of the screen. Accordingly, the direction of road specification is decided by the image height of the screen.

FIG. 22 illustrates an example in which the distant small frame is defined in the area behind the subject vehicle in the driving direction during passage through a right-hand curve road. In this case, as described above in FIG. 9, a distant road vanishing point 2202 in the driving direction is shifted leftward from a reference point 2201. A distant small frame 2204 is preferably defined at a position shifted slightly rightward from a position just under the distant road vanishing point 2202, allowing for the situations in which a distant vehicle 2203 moves rightward along a road 2200 and avoiding the streetlights (not illustrated) at the sides of the road from entering in the distant small frame. The following description is also applied to the case where the predicted driving direction of the subject vehicle curves to the left.

FIG. 23 illustrates an example in which the distant small frame is defined in the area behind the subject vehicle in the driving direction during passage through a left-hand curve road. In this case, as described above with reference to FIG. 10, a distant road vanishing point 2302 in the driving direction is shifted rightward from a reference point 2301. A distant small frame 2304 is preferably defined at a position slightly leftward from a position just under the distant road vanishing point 2302, allowing for the situation in which a distant vehicle 2303 moves leftward along a road 2300 and avoiding the streetlights (not illustrated) at the sides of the road from entering in the distant small frame. The following description is also applied to the case where the predicted driving direction of the subject vehicle curves to the left.

In the examples illustrated in FIGS. 14, 22, and 23, the rectangular distant small frame is defined. Alternatively, the distant small frame may be defined in any other shape such as a triangle, a sector, or a trapezoid. As the ridge lines of the road become narrower toward the distance (that is, the vanishing point) during driving, the rectangular distant small frame contains useless regions other than the road (in other words, the regions in the absence of automobile lamps) when defined. In contrast to this, the use of the tapered distant small frame formed in a triangular, a sector, or a trapezoidal shape can suppress the occurrence of useless regions.

Figure 35:
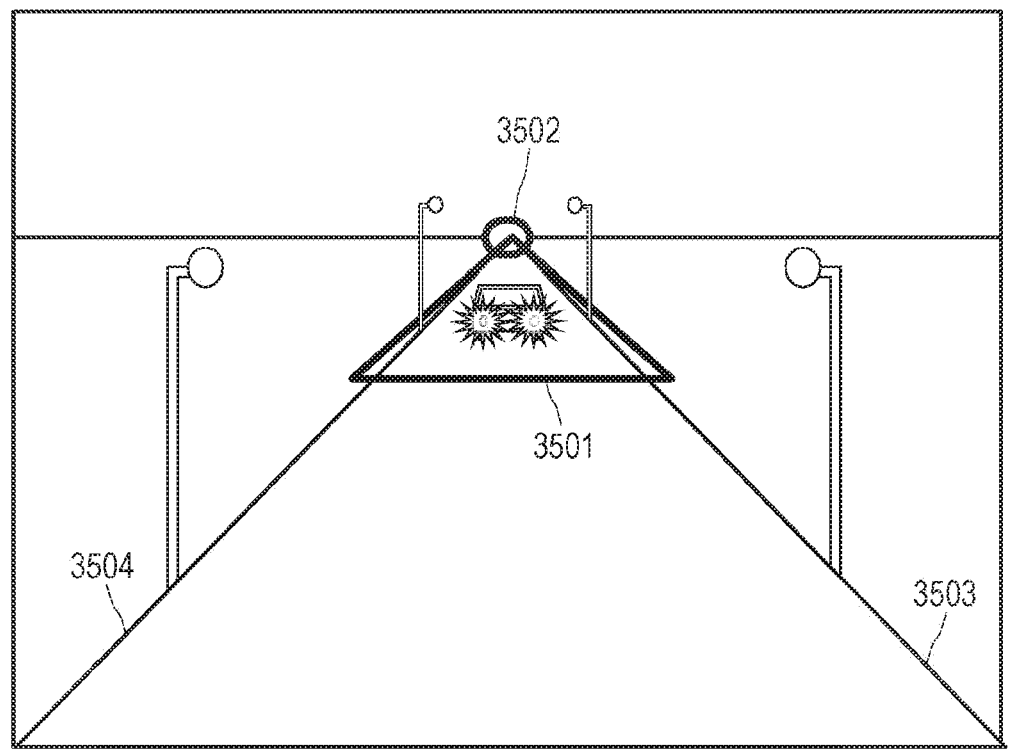
FIG. 35 is a diagram illustrating an example in which a distant small frame is defined based on a distant road vanishing point in the driving direction of a subject vehicle.

FIG. 35 illustrates an example in which a triangular distant small frame 3501 is defined with reference to a distant road vanishing point 3502 in an image shot by the in-vehicle camera. First, one of the apexes of the triangle is aligned with the distant road vanishing point 3502. Then, the two sides of the triangle are extended from the distant road vanishing point 3502 along right and left ridge lines 3503 and 3504 of the road, and the triangle in that state is defined as distant small frame 3501. The right and left ridge lines 3503 and 3504 of the road are detected by a lane detection unit. The lane detection unit detects the ridge lines of the road, lane markers and white lines near road shoulders, and others by the use of an edge detection algorithm, and detects the right and left ridge lines 3503 and 3504 of the road based on the detected lines and markers. By defining the triangular distant small frame 3501, it is possible to prevent light sources such as streetlights from entering into the distant small frame 3501 and detect reliably the vehicle lamps existing on the road. In addition, by defining the triangular distant small frame 3501, it is possible to increase the area of the distant small frame 3501 while preventing the streetlights from entering into the distant small frame 3501.

Figure 36:
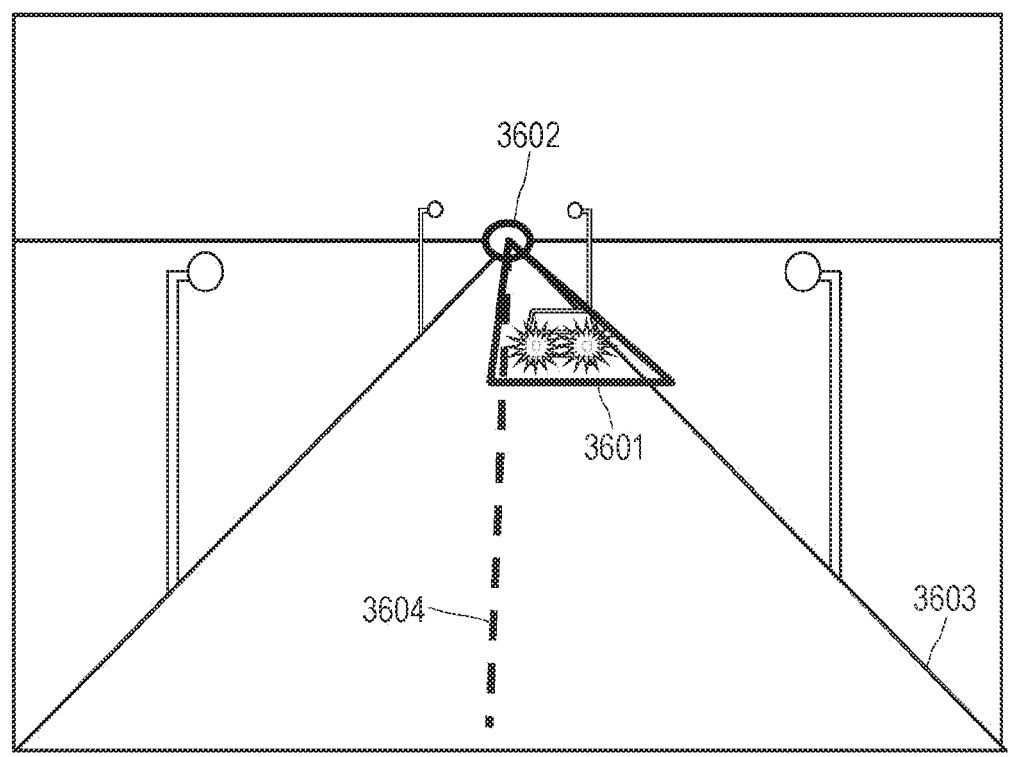
FIG. 36 is a diagram illustrating an example in which a distant small frame is defined based on a distant road vanishing point in the driving direction of a subject vehicle.

FIG. 36 illustrates another example in which a triangular distant small frame 3601 is defined with reference to a distant road vanishing point 3602 in an image shot by the in-vehicle camera. The difference from the example illustrated in FIG. 35 is in that the triangular distant small frame 3601 is defined along the left lane for regions where drivers keep to the left side of the road. First, one of the apexes of the triangle is aligned with the distant road vanishing point 3602. Then, when the lane detection unit (described above) detects a left ridge line (or lane marker near the left road shoulder) 3603 and a center line 3604, a triangle is formed such that the distant road vanishing point 3602 is set on the top and two sides of the triangle are extended along the left ridge line (or lane marker) 3603 and the center line 3604, and then the triangle in that state is defined as distant small frame 3601. Although not illustrated, for regions where drivers keep to the right side of the road, a triangle may be formed such that the distant road vanishing point is set on the top and the two sides are extended along the right ridge line (or lane marker near the right road shoulder) and the center line of the road, and the triangle in that state may be defined as a distant small frame. In this manner, by defining the triangular distant small frame including only the left (or right) lane, it is possible to produce an additional merit of preventing false detection (or unnecessary detection) of the tail lamps of vehicles driving the opposite lane.

Figure 37:
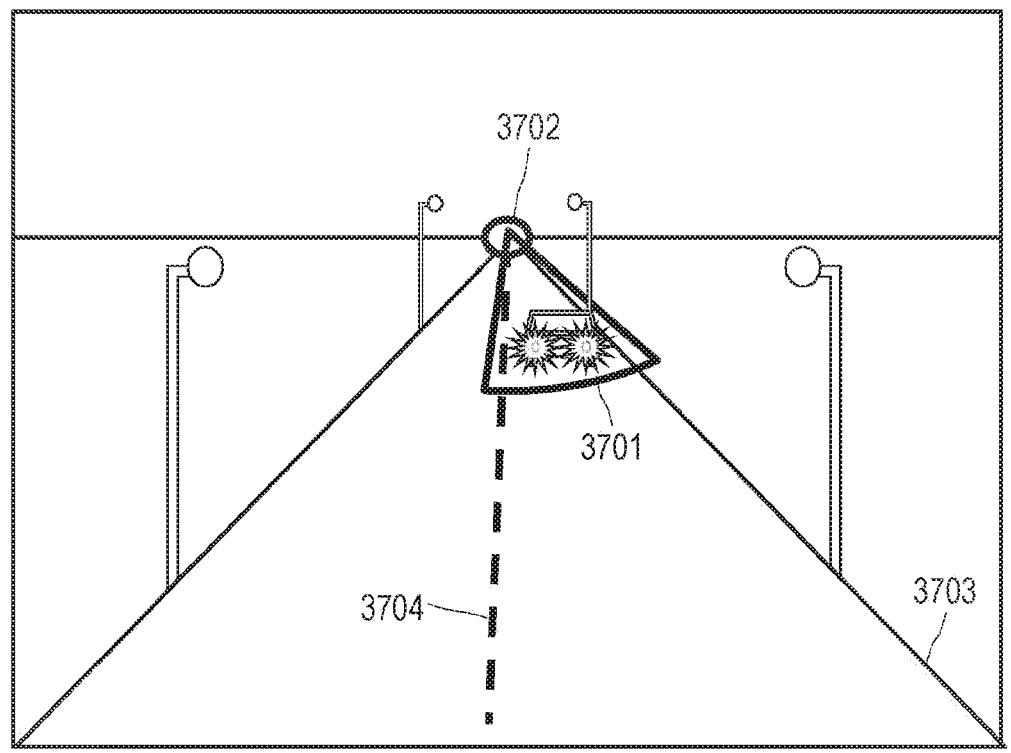
FIG. 37 is a diagram illustrating an example in which a distant small frame is defined based on a distant road vanishing point in the driving direction of a subject vehicle.

FIG. 37 illustrates an example in which a sector distant small frame 3701 is defined with reference to a distant road vanishing point 3702 in an image shot by the in-vehicle camera. The example of FIG. 37 is directed to regions where drivers keep to the left side of the road, as in the example of FIG. 36. First, the center of the sector is aligned with the distant road vanishing point 3702. Then, the lane detection unit (described above) detects a left ridge line (or lane marker near the left road shoulder) 3703 and a center line 3704 of the road, the sector is formed such that the distant road vanishing point 3702 is centered and two radial lines are made along the left ridge line (or lane marker) 3703 and the center line 3704 of the road, and the sector in that state is defined as distant small frame 3701. Although not illustrated, for regions where drivers keep to the right side of the road, a sector may be formed such that the distant road vanishing point is centered and the two radial lines are made along the right ridge line (or lane marker near the right road shoulder) and the center line of the road, and the sector in that state may be defined as distant small frame. In this manner, by defining not the triangular distant small frame but the sector distant small frame, it is possible to further increase the area of the distant small frame (without including useless regions) and further enhance the probability of detection of the head lights of following vehicles (or the taillights of preceding vehicles).

Figure 38:
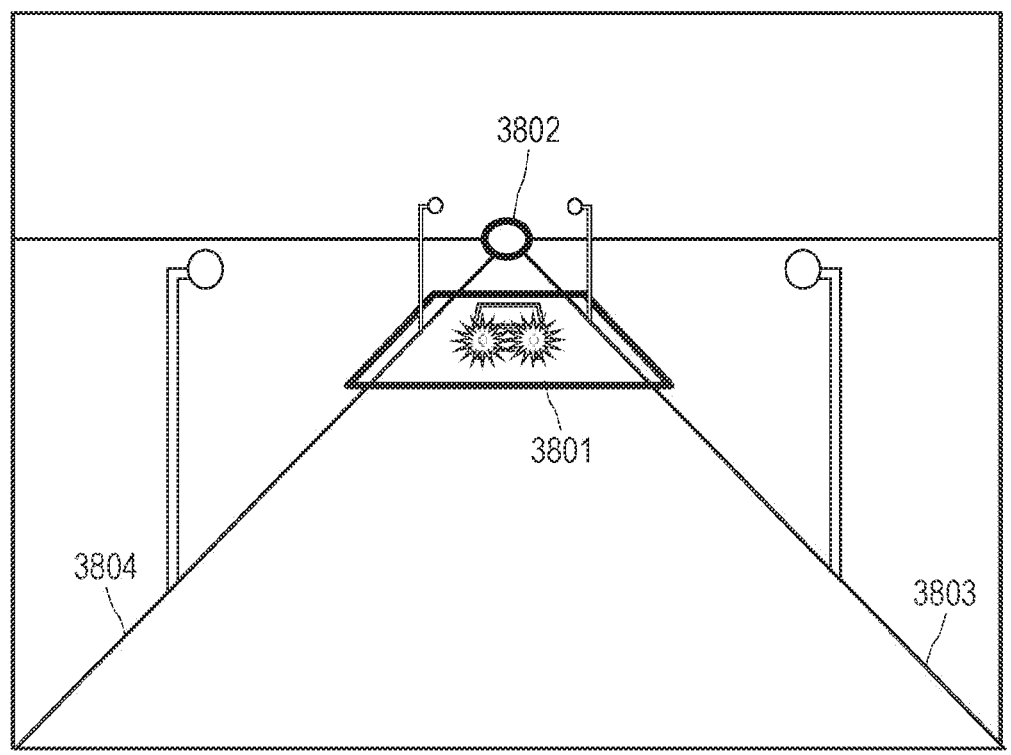
FIG. 38 is a diagram illustrating an example in which a distant small frame is defined based on a distant road vanishing point in the driving direction of a subject vehicle.

FIG. 38 illustrates an example in which a trapezoidal distant small frame 3801 is defined with reference to a distant road vanishing point 3802 in an image shot by the in-vehicle camera. First, the upper and lower bases of a trapezoid are set at predetermined positions in front of the distant road vanishing point 3802. Then, when the lane detection unit (described above) detects right and left ridge lines of the road (or lane markers near the right and left road shoulders) 3803 and 3804, the trapezoid composed of the upper and lower bases and a pair of legs along the right and left ridge lines 3803 and 3804 of the road is defined as distant small frame 3801. In this manner, by defining the trapezoidal distant small frame, it is possible to detect only the head lights of the vehicle immediately following the subject vehicle (or detect only the taillights of the vehicle immediately preceding the subject vehicle) to prevent false detection of the head lights of vehicles following the immediately following vehicle (or the taillights of vehicles preceding the immediately preceding vehicle).

Figure 39:
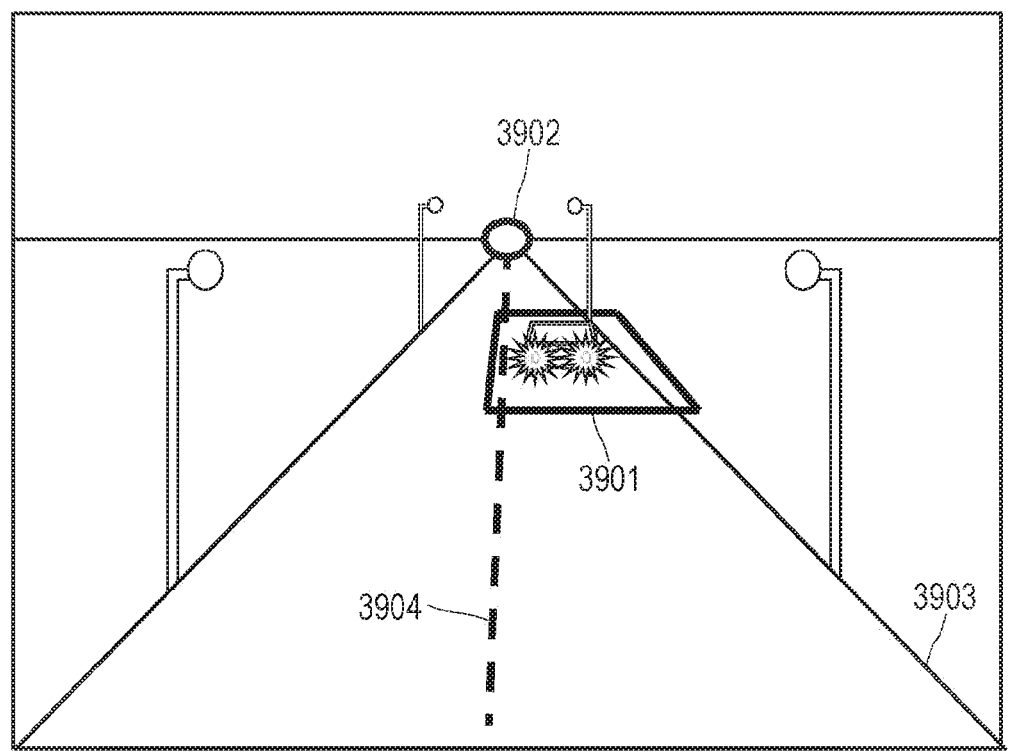
FIG. 39 is a diagram illustrating an example in which a distant small frame is defined based on a distant road vanishing point in the driving direction of a subject vehicle.

FIG. 39 illustrates another example in which a trapezoidal distant small frame 3901 is defined with reference to a distant road vanishing point 3902 in an image shot by the in-vehicle camera. The difference from the example of FIG. 38 is in that the distant small frame 3901 is defined along the left lane for regions where drivers keep to the left side of the road. First, the upper and lower bases of a trapezoid are set at predetermined positions in front of the distant road vanishing point 3902. Then, when the lane detection unit (described above) detects a left ridge line (or lane marker near left road shoulder) 3903 and a center line 3904 of the road, the trapezoid composed of the upper and lower bases and a pair of legs along the left ridge line 3903 and the center line 3904 of the road is defined as distant small frame 3901. Although not illustrated, for regions where drivers keeps to the right side of the road, the trapezoid composed of the upper and lower bases set at predetermined positions with reference to the distant road vanishing point and a pair of legs along the right ridge line (or lane marker near right road shoulder) and the center line of the road may be defined as distant small frame.

Figure 40:
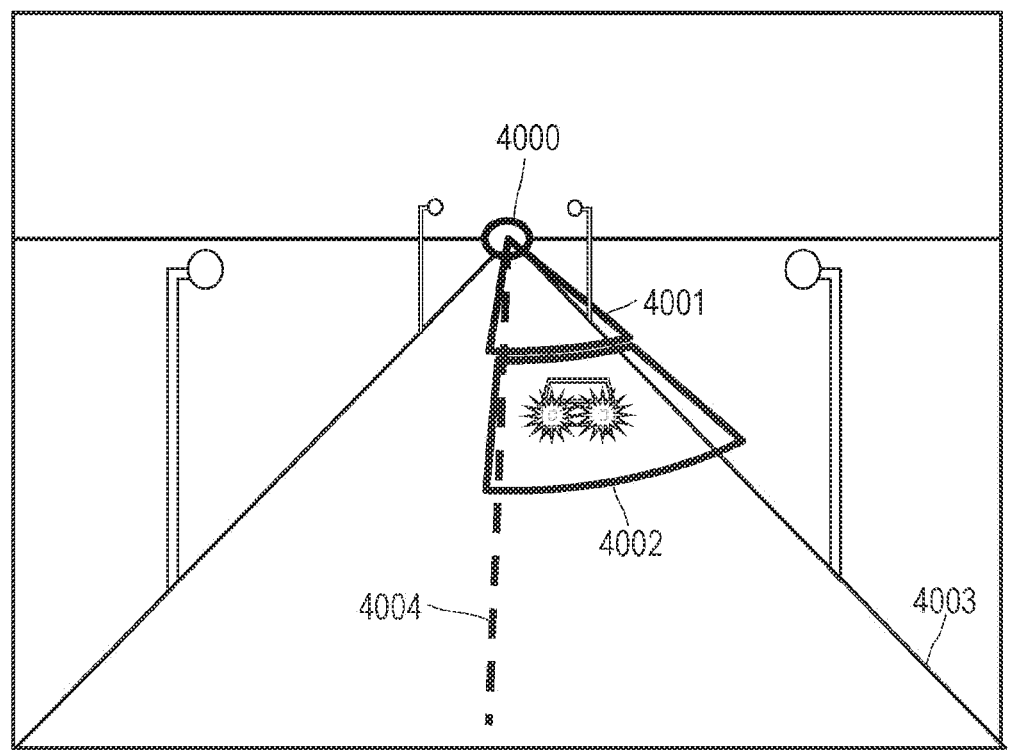
FIG. 40 is a diagram illustrating an example in which a distant small frame is defined based on a distant road vanishing point in the driving direction of a subject vehicle.

FIG. 40 illustrates another example of a distant small frame defined with reference to a distant road vanishing point 4000 in an image shot by the in-vehicle camera. In the illustrated example, defined are: a first distant small frame 4001 composed of a sector having the center aligned with the distant road vanishing point 4000; and an annular second distant small frame 4002 concentric with the first distant small frame 4001 (in other words, having the center aligned with the distant road vanishing point 4000). First, the center of the sector is aligned with the distant road vanishing point 4000. Then, when the lane detection unit (described above) detects a left ridge line (or lane marker near the left road shoulder) 4003 and a center line 4004 of the road, the sector is formed such that the distant road vanishing point 4000 is centered and two radial lines are made along the left ridge lines (or lane marker) 4003 and the center line 4004, and the sector in that state is defined as first distant small frame 4001. In addition, the annular second distant small frame 4002 is defined outside of the first distant small frame 4001, so as to have an inner perimeter and an outer perimeter at predetermined spaces from the distant road vanishing point 4000 and be concentric with the first distant small frame 4001. Although not illustrated, for regions where drivers keep to the right side of the road, the first and second distant small frames may be defined to be bilaterally symmetric with respect to the foregoing ones.

As a summary of the descriptions in FIGS. 22, 23, and 35 to 40, the distant small frame should be defined based on the relative position of the distant road vanishing point in the driving direction of the subject vehicle to the reference point (distant point at infinity in the image shot by the in-vehicle camera). By adjusting the position of the distant small frame based on the relative position of the distant road vanishing point in the driving direction of the subject vehicle to the reference point, there is a merit that, even when any unnecessary light sources such as the streetlights at the sides of the road on which the subject vehicle is driving enter into the field of view of the in-vehicle camera, the light sources can be excluded from the distant small frame.

FIG. 24 shows a flowchart of a process for defining the distant small frame to prioritize the detection of automobile lamps executed at step S705 in the flowchart shown in FIG. 7.

The processing unit 605 first reads the distant road vanishing point corrected at previous step S704 (step S2401).

Next, the processing unit 605 reads the position of the reference point from the memory (ROM) 606 (step S2402). Then, the processing unit 605 compares the positions of the reference point and the distant road vanishing point (step S2403), and decides the central position of the distant road vanishing point based on the results of comparison (step S2404). For example, as illustrated in FIGS. 22 and 23, when the distant road vanishing point is shifted rightward from the reference point, the processing unit 605 decides the central position of the distant small frame shifted leftward from a position just under the distant road vanishing point. In contrast, when the distant road vanishing point is shifted leftward from the reference point, the processing unit 605 decides the central position of the distant small frame shifted rightward from a position just under the distant road vanishing point.

Next, the processing unit 605 reads the size and shape of the distant small frame from the memory (ROM) 606 (step S2405), and decides the positions of the starting point (upper left) and end point (lower right) of the distant small frame (step S2406). The shape of the distant small frame is basically a landscape-oriented rectangle. However, the distant small frame may be changed to another shape such as a triangle, a sector, or a trapezoid, depending on the position of the distant road vanishing point or the like (see FIGS. 35 to 40).

The range of the distant small frame is preferably set such that no light sources other than a distant vehicle such as the streetlights at the sides of the road enter into the frame. As described above, when the distant road vanishing point is shifted rightward from the reference point, the central position of the distant small frame is decided at a position shifted leftward from a position just under the distant road vanishing point (see FIG. 23), and in contrast, when the distant road vanishing point is shifted leftward from the reference point, the central position of the distant small frame is decided at a position shifted rightward from a position just under the distant road vanishing point (see FIG. 22), thereby avoiding the streetlights from entering into the distant small frame. In addition, the distant small frame may be changed to another shape such as a triangle, a sector, or trapezoid so that the streetlights do not enter into the distant small frame.

Alternatively, the central position of the distant small frame may be decided with respect to not the distant road vanishing point exactly decided on the image shot by the in-vehicle camera but a distant road vanishing point approximated based on a driving history of the subject vehicle (information on changes in yaw angle and pitch angle) as described above with reference to FIGS. 20 and 21.

The processing unit 605 produces a brightness horizontal profile within the defined distant small frame at next step S706. As described above with reference to FIGS. 15 to 18, the brightness horizontal profile within the distant small frame is produced by deciding the weights in the individual scan lines based on the sum of brightness values of the pixels in the scan line direction, adding the weights in the individual scan lines to the brightness values of the pixels in the scan direction for the individual horizontal pixel positions within the distant small frame to smooth out the brightness values.

Figure 25A:
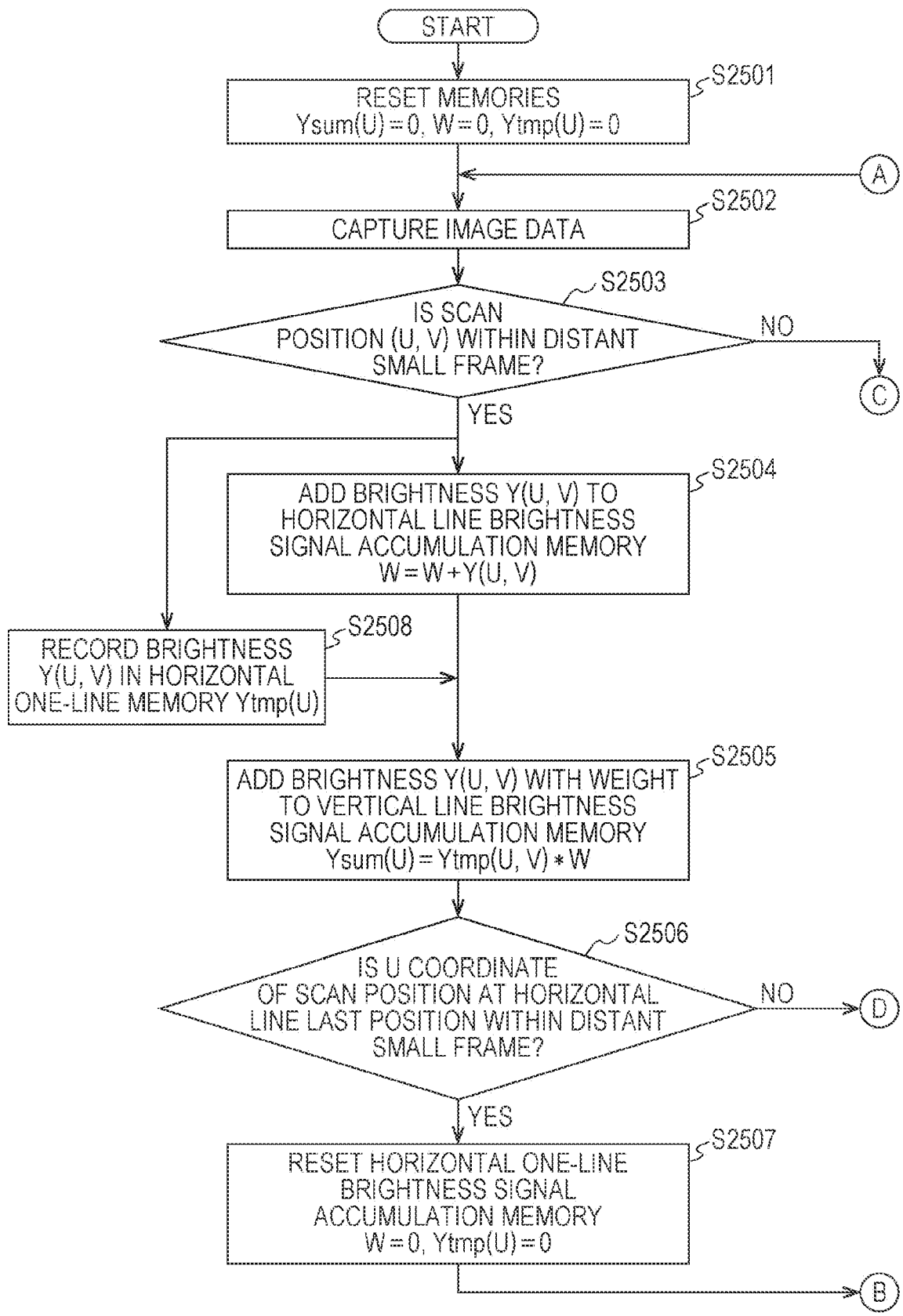
FIG. 25A is a flowchart of a process for creating a brightness horizontal profile within a distant small frame.
Figure 25B:
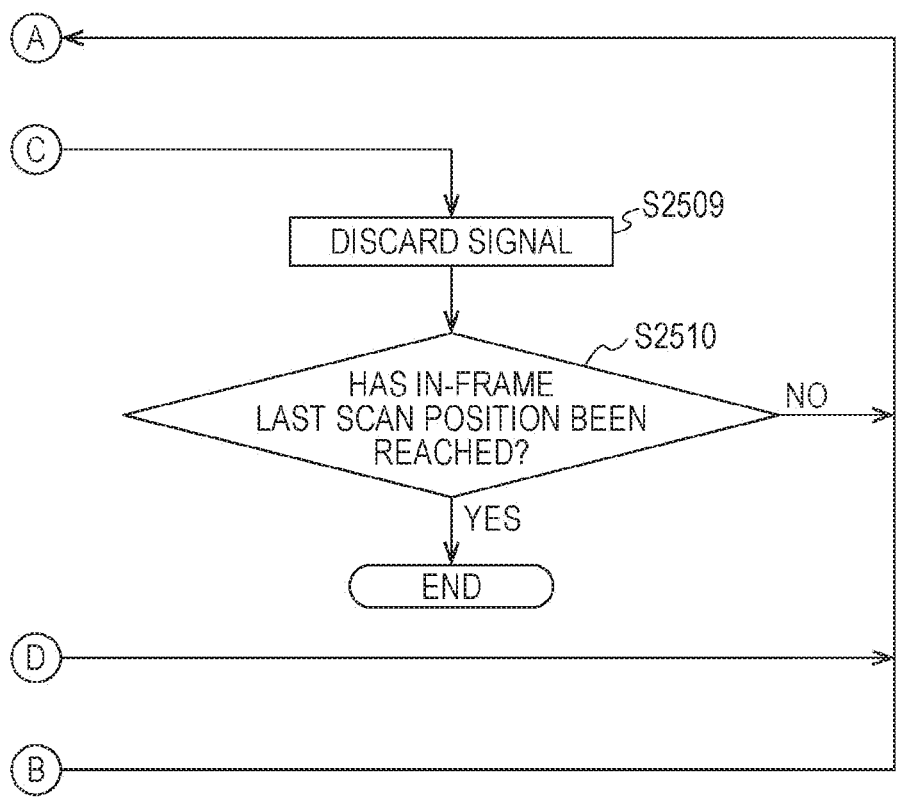
FIG. 25B is a flowchart of the process for creating a brightness horizontal profile within a distant small frame.

FIGS. 25A and 25B show a flowchart of a process for producing the brightness horizontal profile within the distant small frame. In the process described in the drawings, brightness information for one scan line being read is recorded in the memory and the brightness information is weighted based on the sum of brightness values in the same scan line, thereby weighting the brightness values in the scan direction.

The processing unit 605 first resets a vertical line brightness signal accumulation memory Ysum(U) for accumulating a weighted brightness sum value at a horizontal pixel position U within the distant small frame, a horizontal one-line brightness signal accumulation memory W, and a horizontal one-line memory Ytmp(U) to their initial value of 0 (step S2501).

Next, the processing unit 605 captures pixel data having undergone raster scanning at preceding step S701 (step S2502).

When the scan position (U, V) falls within the range of the distant small frame (step S2503: Yes), the processing unit 605 adds sequentially the brightness Y(U,V) at that scan position to the horizontal line brightness signal accumulation memory W (step S2504), and records the brightness Y(U, V) in the horizontal one-line memory Ytmp(U) (step S2508).

The processing unit 605 adds the brightness Y (U,V) with weight to the vertical line brightness signal accumulation memory Ysum(U) (step S2505).

Next, the processing unit 605 checks whether a horizontal (U) coordinate at the scan position has reached a horizontal line last position U=Uend(V) within the distant small frame (step S2506).

When the horizontal (U) coordinate at the scan position has not reached the horizontal line last position U=Uend(V) within the distant small frame (step S2506: No), the processing unit 605 returns to step S2502 to perform repeatedly the foregoing process on the next scan data.

When the horizontal (U) coordinate at the scan position has reached the horizontal line last position U=Uend(V) within the distant small frame (step S2506: Yes), the processing unit 605 resets both the horizontal one-line brightness signal accumulation memory W and the horizontal one-line memory Ytmp(U) to their initial value of 0 (step S2507), and returns to step S2502 to perform repeatedly the foregoing process on the next scan data.

In contrast, when the scan position (U, V) falls outside the range of the distant small frame (step S2503: No), the processing unit 605 discards the signal (step S2509). Then, when the last scan position (Ulast, Vlast) within the frame has not been reached (step S2510: No), the processing unit 605 returns to step S2502 to perform repeatedly the foregoing process on the next scan data. When the last scan position (Ulast, Vlast) within the frame has been reached (step S2510: Yes), the brightness horizontal profile (see FIG. 18) is completed and the routine of this process is terminated.

Figure 26A:
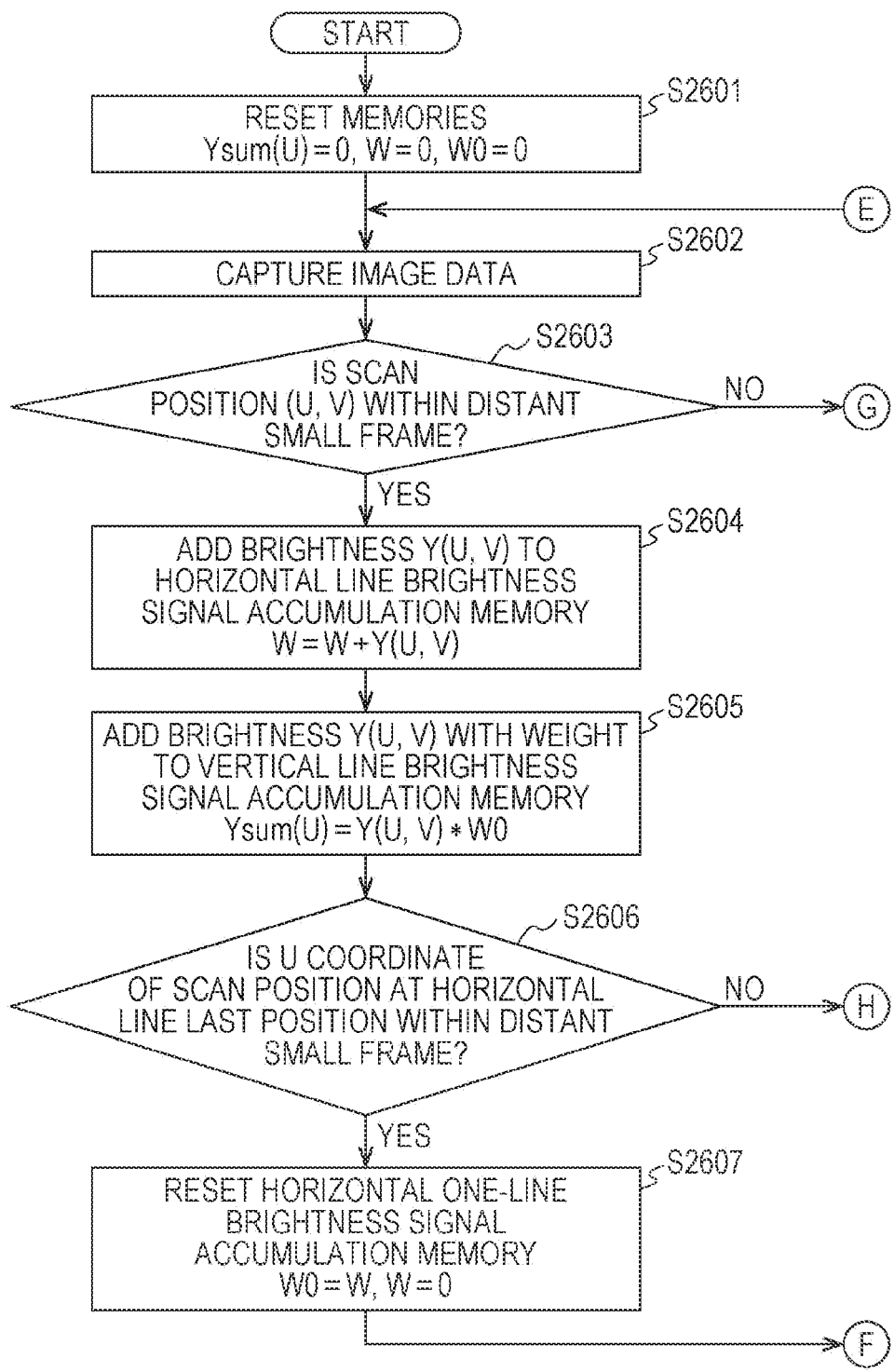
FIG. 26A is a flowchart of another process for creating a brightness horizontal profile within a distant small frame.
Figure 26B:
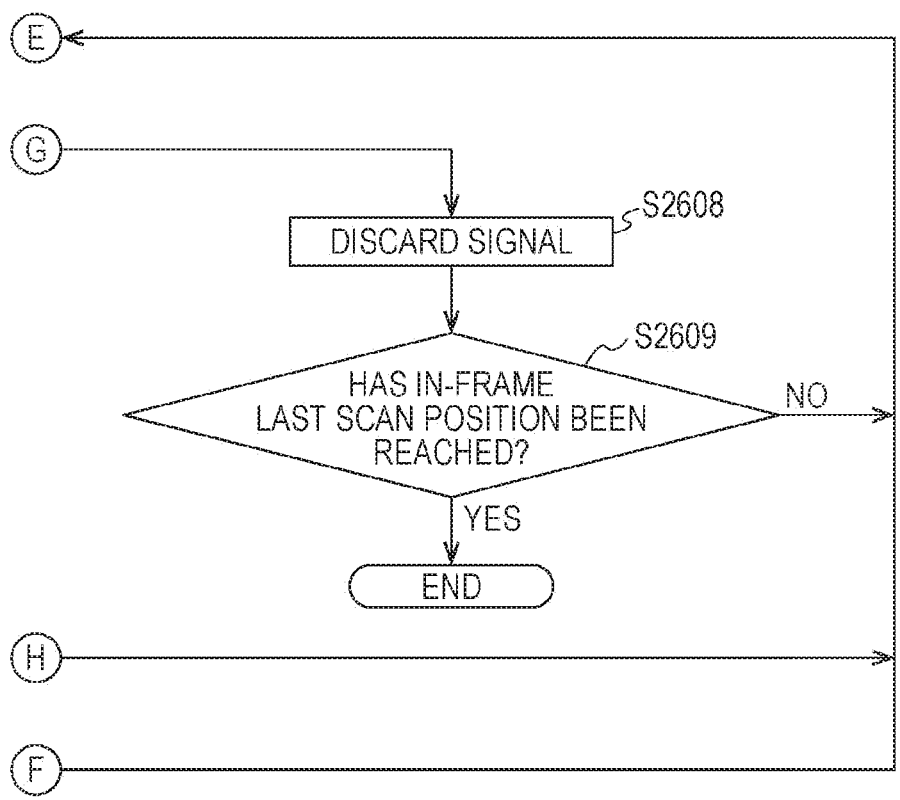
FIG. 26B is a flowchart of the other process for creating a brightness horizontal profile within a distant small frame.

FIGS. 26A and 26B show a flowchart of another process for producing the brightness horizontal profile within the distant small frame. In the process shown in the drawings, unlike in the process shown in FIGS. 25A and 25B, weighting is performed based on the brightness sum value in one preceding scan line, and the brightness values are weighted in the scan direction. This process saves memory capacity for recording brightness information for one scan line.

The processing unit 605 first resets the vertical line brightness signal accumulation memory Ysum(U) for accumulating a weighted brightness sum value at the horizontal pixel position U within the distant small frame, the horizontal one-line brightness signal accumulation memory W, and the horizontal one-line memory W0 to their initial value of 0 (step S2601).

Next, the processing unit 605 captures pixel data having undergone raster scanning at preceding step S701 (step S2602).

When the scan position (U, V) falls within the range of the distant small frame (step S2603: Yes), the processing unit 605 adds sequentially the brightness Y(U,V) at that scan position to the horizontal line brightness signal accumulation memory W (step S2604).

The processing unit 605 adds the brightness Y(U,V) with the weight recorded in the horizontal one-line brightness signal accumulation memory W0 to the vertical line brightness signal accumulation memory Ysum(U) (step S2605). The memory W0 records the weight based on the brightness sum value in one preceding scan line.

Next, the processing unit 605 checks whether a horizontal (U) coordinate at the scan position has reached a horizontal line last position U=Uend(V) within the distant small frame (step S2606).

When the horizontal (U) coordinate at the scan position has not reached the horizontal line last position U=Uend(V) within the distant small frame (step S2606: No), the processing unit 605 returns to step S2602 to perform repeatedly the foregoing process on the next scan data.

When the horizontal (U) coordinate at the scan position has reached the horizontal line last position U=Uend(V) within the distant small frame (step S2506: Yes), the processing unit 605 substitutes the value in the horizontal one-line brightness signal accumulation memory W in the memory W0 and resets the memory to its initial value of 0 (step S2607), and then returns to step S2602 to perform repeatedly the process on the next scan data.

In contrast, when the scan position (U, V) falls outside the range of the distant small frame (step S2603: No), the processing unit 605 discards the signal (step S2608). Then, when the last scan position (Ulast, Vlast) within the frame has not been reached (step S2609: No), the processing unit 605 returns to step S2602 to perform repeatedly the foregoing process on the next scan data. When the last scan position (Ulast, Vlast) within the frame has been reached (step S2609: Yes), the brightness horizontal profile (see FIG. 18) is completed and the routine of this process is terminated.

Figure 27:
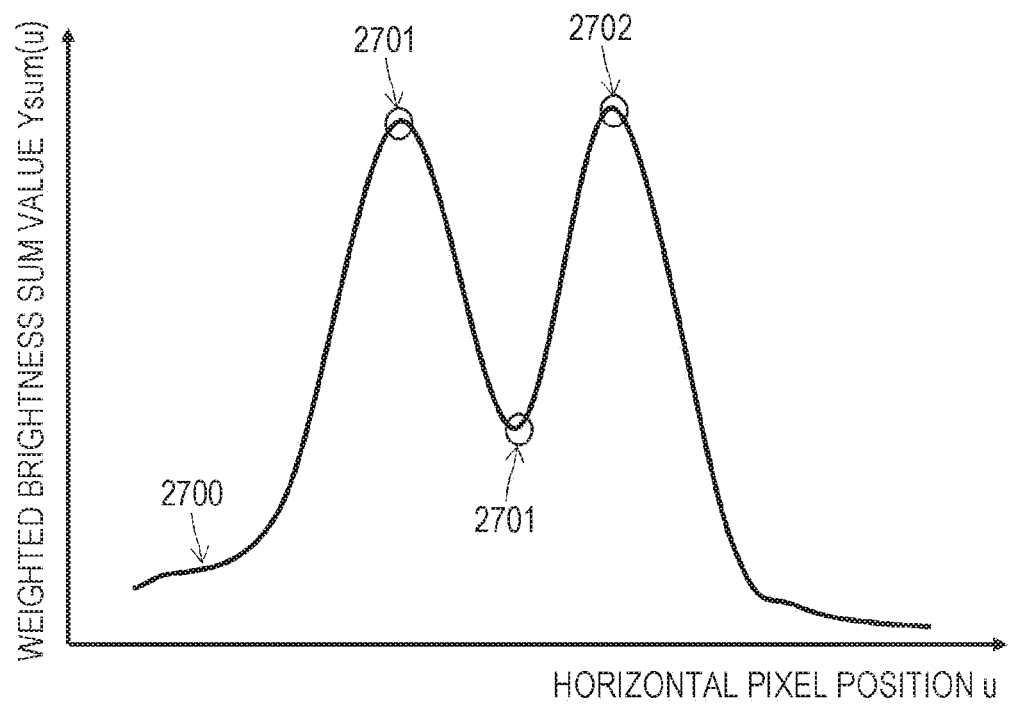
FIG. 27 is a diagram illustrating adjacent maximum values and a minimum value between the maximum values in a brightness horizontal profile within a distant small frame.

The processing unit 605 checks at next step S707 whether there are the lamps of an automobile within the distant small frame (that is, the headlights of a distant oncoming vehicle (or following vehicle) or the taillights of a following vehicle)) within the distant small frame based on the brightness horizontal profile. As described above with reference to FIG. 18, it is expected that two peaks (maximum points) appear in the brightness horizontal profile within the distant small frame including the two luminous points (the headlights of the distant vehicle). As illustrated in FIG. 27, it is possible to determine easily on the presence or absence of the lamps of an automobile within the distant small frame, based on brightness information and positional relationship relating to adjacent maximum values 2701 and 2702 and a minimum value 2703 between these maximum values in a brightness horizontal profile 2700 within the distant small frame.

Figure 28A:
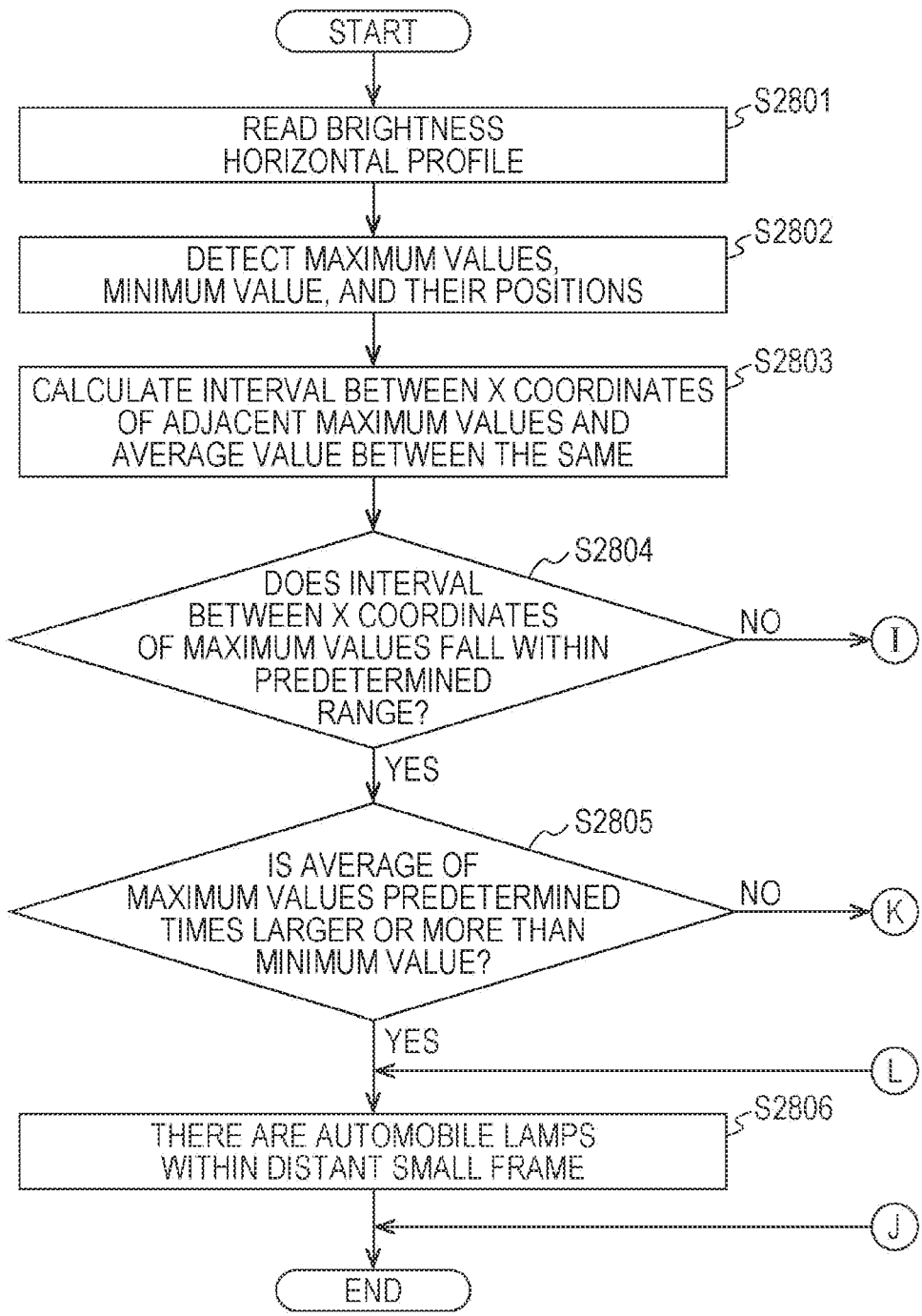
FIG. 28A is a flowchart of a process for determining whether the lamps of an automobile are located within a distant small frame based on a brightness horizontal profile.
Figure 28B:
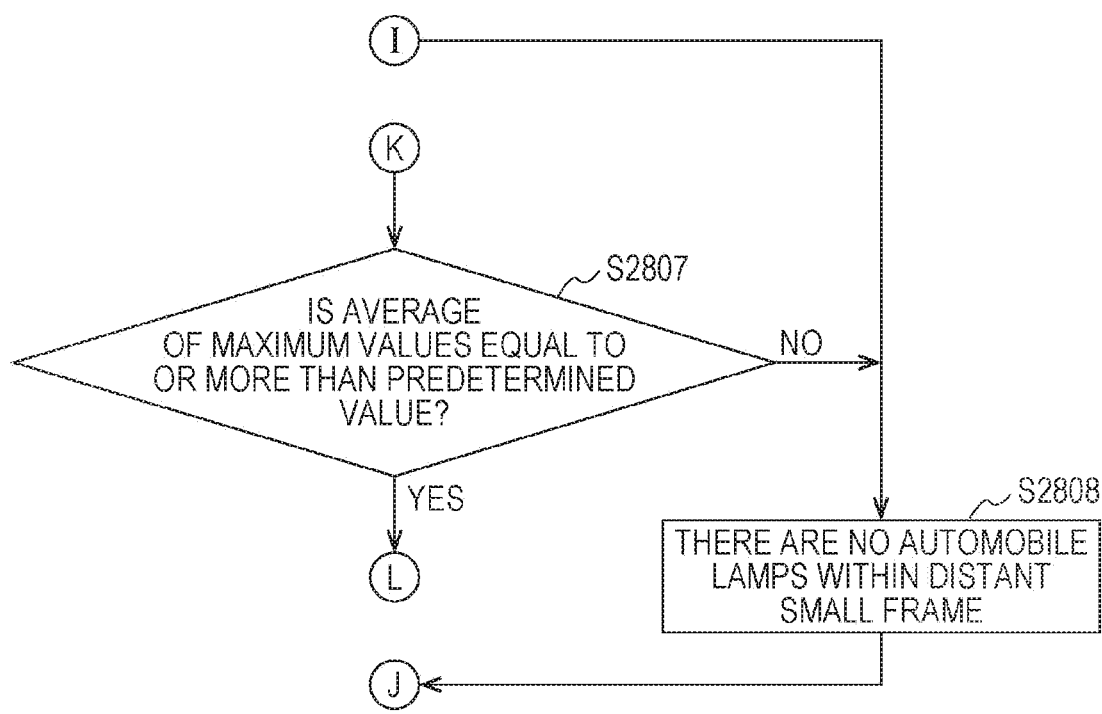
FIG. 28B is a flowchart of the process for determining whether the lamps of an automobile are located within a distant small frame based on a brightness horizontal profile.

FIGS. 28A and 28B show a flowchart of a detailed process for determining whether there are the lamps of an automobile within the distant small frame based on the brightness horizontal profile.

The processing unit 605 first reads the brightness horizontal profile produced at previous step S706 (step S2801). Then, the processing unit 605 analyzes the read brightness horizontal profile to detect the two adjacent maximum values, the minimum value between the maximum values, and their positions (horizontal pixel positions) (step S2802).

Next, the processing unit 605 calculates the interval between X coordinates of the two adjacent maximum values and the average of the same (step S2803). Then, the processing unit 605 checks whether the interval between the X coordinates of the adjacent maximum values falls within a predetermined range (step S2804).

When the interval between the X coordinates of the adjacent maximum values falls outside the predetermined range (step S2804: No), the processing unit 605 determines that luminous points corresponding to the two maximum values are not the lamps (headlights or taillights) of a distant vehicle and returns the result of determination that there are no lamps of an automobile within the distant small frame (step S2808). Besides the lamps of an automobile, the maximum values may indicate the streetlights at the sides of the road or illumination of buildings around the road as an example.

In contrast, when the interval between the X coordinates of the adjacent maximum values falls within the predetermined range (step S2804: Yes), the processing unit 605 further checks whether the average of the adjacent maximum values is a predetermined times larger than the minimum value between the maximum values or more (step S2805).

When the average of the adjacent maximum values is the predetermined times larger than the minimum value between the maximum values or more (step S2805: Yes), the two adjacent maximum values can be said to be two luminous points (headlights or taillights). The processing unit 605 returns the result of determination that there are the lamps of an automobile within the distant small frame (step S2806).

When the average of the adjacent maximum values is the predetermined time larger than the minimum value or more (step S2805: No), the processing unit 605 further checks whether the average of the adjacent maximum values is equal to or more than a predetermined value (step S2807).

When the average of the adjacent maximum values is not the predetermined time larger than the minimum value between the adjacent maximum values or more but the average of the adjacent maximum values is equal to or more than the predetermined value (step S2807: Yes), the adjacent maximum values can be said to be two luminous points (headlights or taillights). In this case, the processing unit 605 returns the result of determination that there are the lamps of an automobile within the distant small frame (step S2806).

When the average of the adjacent maximum values is not equal to or more than the predetermined value (step S2807: No), the processing unit 605 determines that the luminous points corresponding to the two maximum values are not the lamps (headlights or taillights) of a distant vehicle and returns the result of determination that there are no lamps of an automobile within the distant small frame (step S2808).

When returning the result of determination that there are no lamps of an automobile within the distant small frame, the processing unit 605 controls an exposure of the in-vehicle camera in the normal automatic exposure control mode. When returning the result of determination that there are the lamps of an automobile within the distant small frame, the processing unit 605 applies the automatic exposure control optimized such that the two luminous points are separated from the brightness horizontal profile (or such that exposure control is performed with priority given to separation of luminous points of a distant vehicle) to the in-vehicle camera.

When determining that there are the lamps of an automobile within the distant small frame, the processing unit 605 applies the automatic exposure control optimized such that the two luminous points can be separated in the brightness horizontal profile (or separation of the luminous points is prioritized) as a process at step S710 to the in-vehicle camera.

Describing with the example illustrated in FIG. 27, the luminous point separation optimized automatic exposure control is a process for allowing easy separation of the adjacent maximum values 2701 and 2702 with the minimum value 2703 between the maximum values in the brightness horizontal profile 2700 within the distant small frame.

Figure 29:
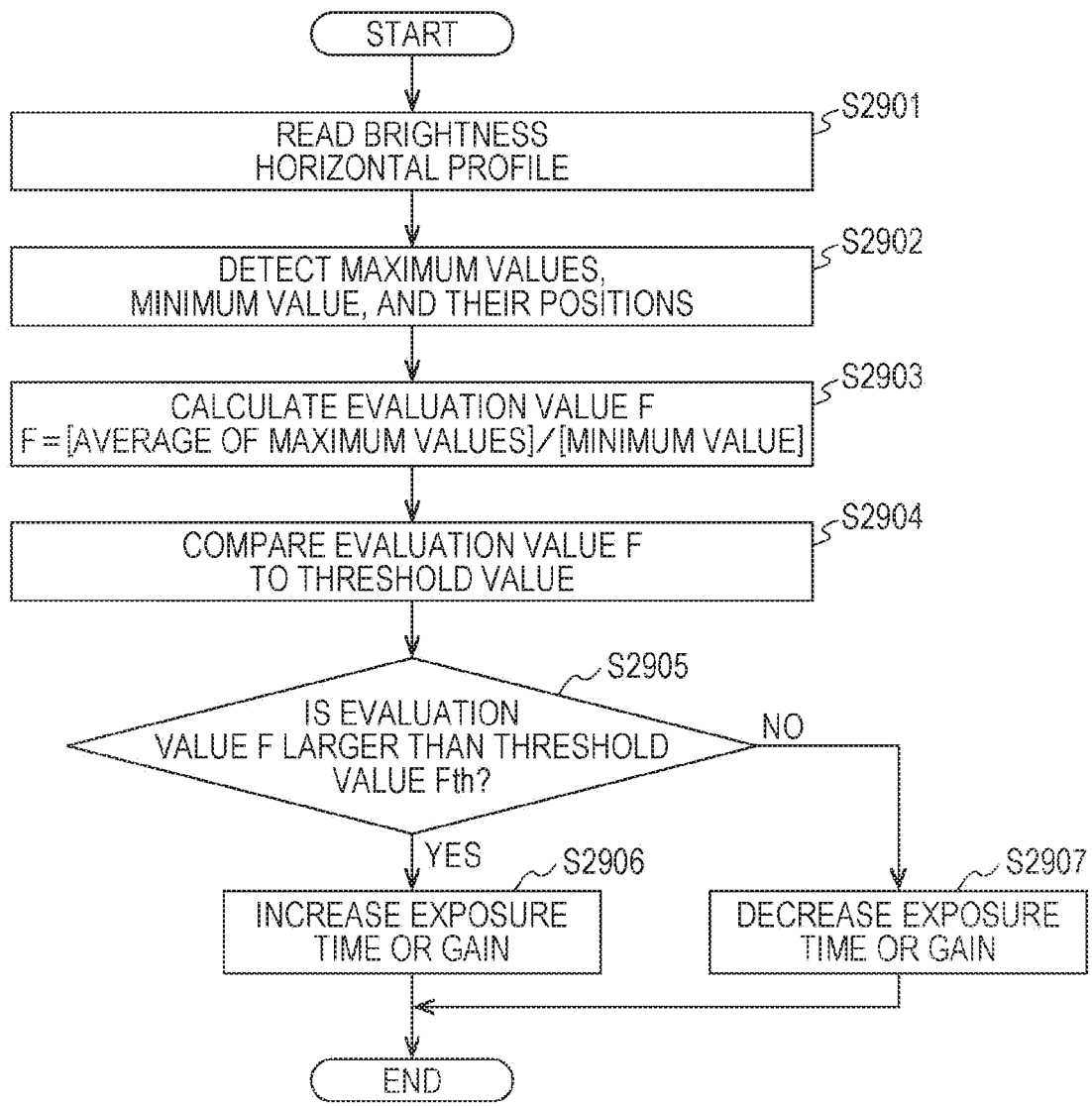
FIG. 29 is a flowchart of a process for performing automatic exposure control of the in-vehicle camera based on the maximum values and the minimum value in the brightness horizontal profile.

FIG. 29 shows a flowchart of a process for performing automatic exposure control of the in-vehicle camera optimized for luminous point separation (or with priority given to luminous point separation). The aim of the automatic exposure control is to allow the shape of the headlights to satisfy the foregoing mathematic expression (1) when the in-vehicle camera shots a following vehicle or an oncoming vehicle in the scene under dark driving environments.

The processing unit 605 first reads the brightness horizontal profile produced at preceding step S706 (step S2901).

Next, the processing unit 605 analyzes the read brightness horizontal profile to detect the two adjacent maximum values and the minimum value between the maximum values (step S2902). Alternatively, the processing unit 605 may read directly the maximum values and the minimum value detected in the process within the distant small frame performed at step S707.

Next, the processing unit 605 divides the average of the adjacent maximum values by the minimum value to calculate an evaluation value F for the automatic exposure control (step S2903).

Next, the processing unit 605 compares the calculated evaluation value F to a predetermined threshold value Fth (step S2904). The threshold value Fth is stored within the memory (ROM) 606, the processing unit 605 reads the threshold value Fth from the memory 606 at step S2904.

Figure 30A:
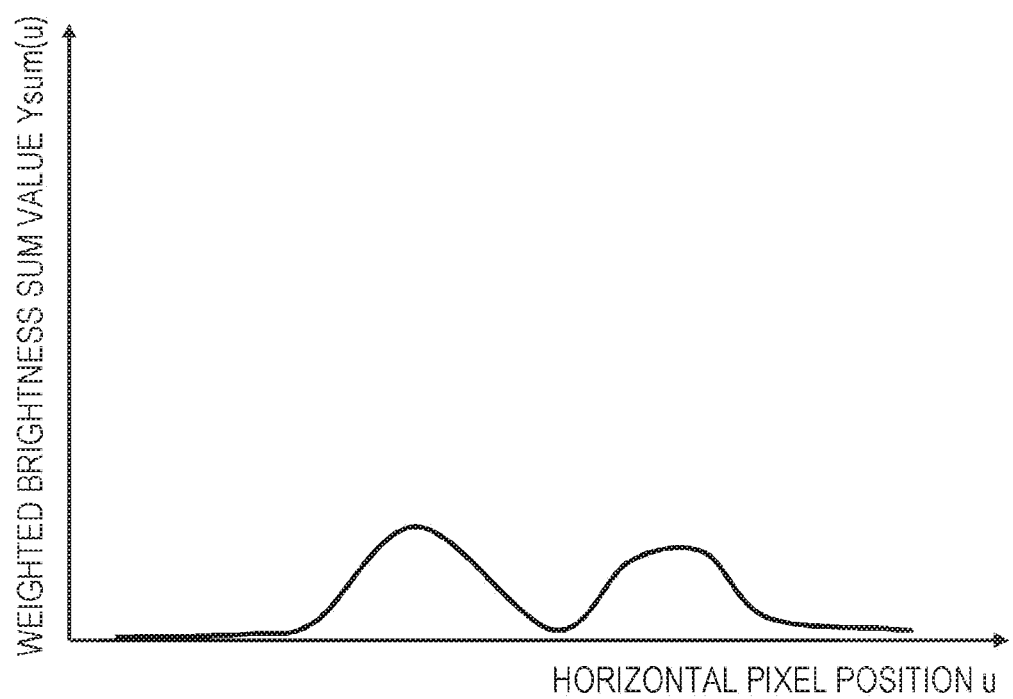
FIG. 30A is a diagram illustrating a brightness horizontal profile within a distant small frame when an evaluation value F for automatic exposure control is large.

When the evaluation value F is larger than the threshold value Fth (step S2905: Yes), the minimum value is small as illustrated in FIG. 30A. This is possibly because the light exposure of the in-vehicle camera is too low, and it is presumed that the shot image appears entirely dark, and the luminous points corresponding to the lamps (headlights or taillights) of a distant vehicle are darkly seen. Thus, the processing unit 605 increases the exposure time or the gain of the in-vehicle camera (step S2906).

Figure 30B:
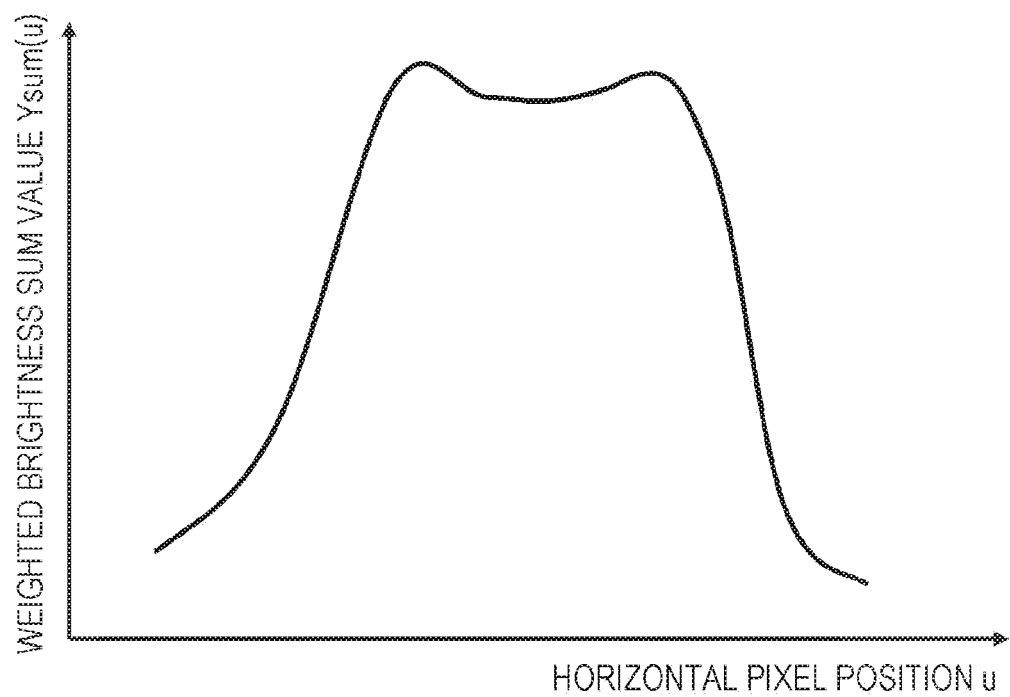
FIG. 30B is a diagram illustrating a brightness horizontal profile within a distant small frame when the evaluation value F for automatic exposure control is small.

In contrast, when the evaluation value F is not larger than the threshold value Fth (step S2905: No), the minimum value is large. In the brightness horizontal profile, the difference between the maximum values and the minimum value is small as illustrated in FIG. 30B. This is possibly because the light exposure of the in-vehicle camera is too high, and the luminous points corresponding to the lamps (headlights or taillights) of the distant vehicle appear blurred and their existence is obscure. Thus, the processing unit 605 decreases the exposure time or the gain of the in-vehicle camera (step S2907).

The threshold value Fth may be a fixed value or a threshold range with a predetermined width. For example, a threshold value Fth1 and a threshold value Fth2 smaller than the threshold value Fth1 may be set, and the exposure time or the gain of the in-vehicle camera may be decreased when the evaluation value F is larger than the threshold value Fth1, and the exposure time or the gain of the in-vehicle camera may be increased when the evaluation value F is smaller than the threshold value Fth2. However, the threshold value Fth1 is desirably 1.1 or more.

Figure 31:
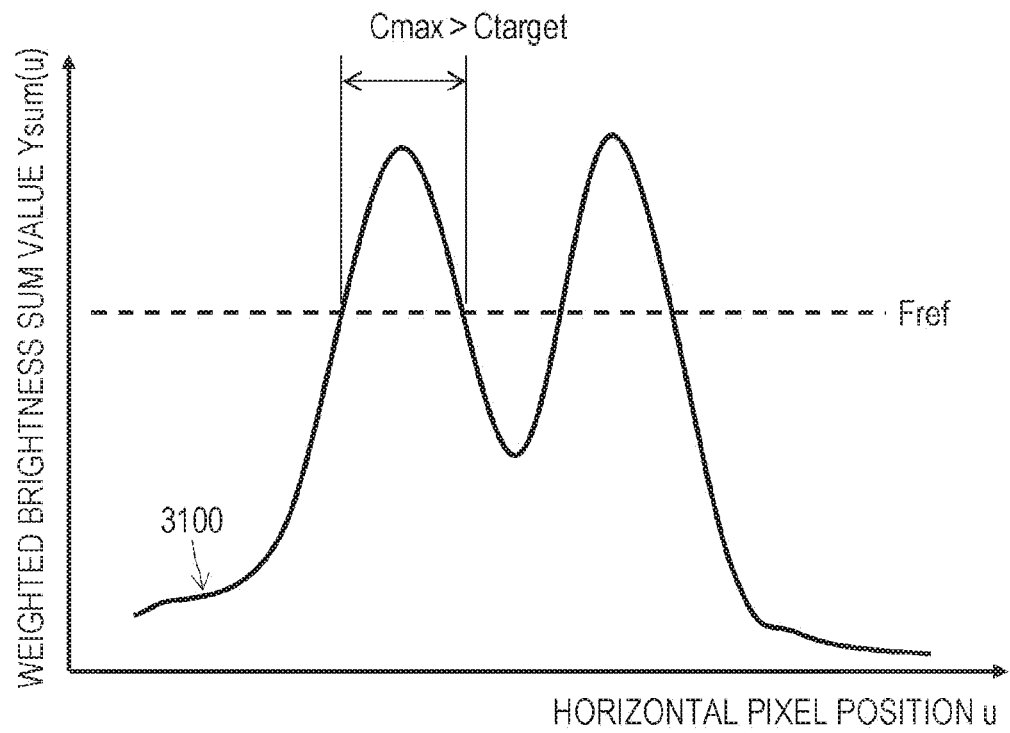
FIG. 31 is a diagram illustrating a brightness horizontal profile within a distant small frame (in the case of shooting in an exposure condition optimized for luminous point separation).
Figure 32:
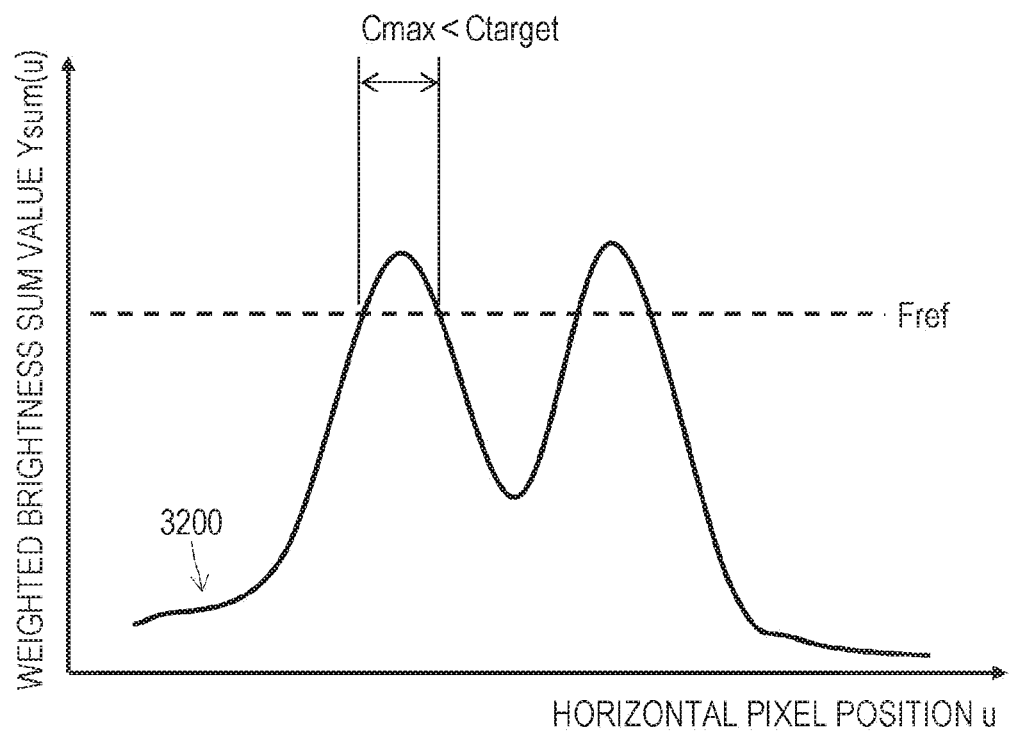
FIG. 32 is a diagram illustrating a brightness horizontal profile within a distant small frame (in the case of shooting in an exposure condition insufficient for luminous point separation).

As described above with reference to FIG. 18, two peaks (maximum points) appear in the brightness horizontal profile in the distant small frame including the two luminous points (the headlights of a distant vehicle). Accordingly, when shooting is performed in the exposure condition (the exposure time or the gain) optimized for (or prioritizing) separation of the two luminous points of the distant vehicle, it is expected that, in a brightness horizontal profile 3100 within the distant small frame, a width maximum value Cmax of a peak exceeding a predetermined threshold value (brightness comparison parameter) Fref is larger than a predetermined target value as illustrated in FIG. 31. When the light exposure is insufficient (the exposure time or the gain is small), it is presumed that, in the brightness horizontal profile 3100 within the distant small frame, the width maximum value Cmax of the peak exceeding the predetermined threshold value (brightness comparison parameter) Fref is smaller than the predetermined target value as illustrated in FIG. 32. Therefore, the luminous point separation optimized automatic exposure control may be performed based on the shape of the brightness horizontal profile within the distant small frame.

Figure 33:
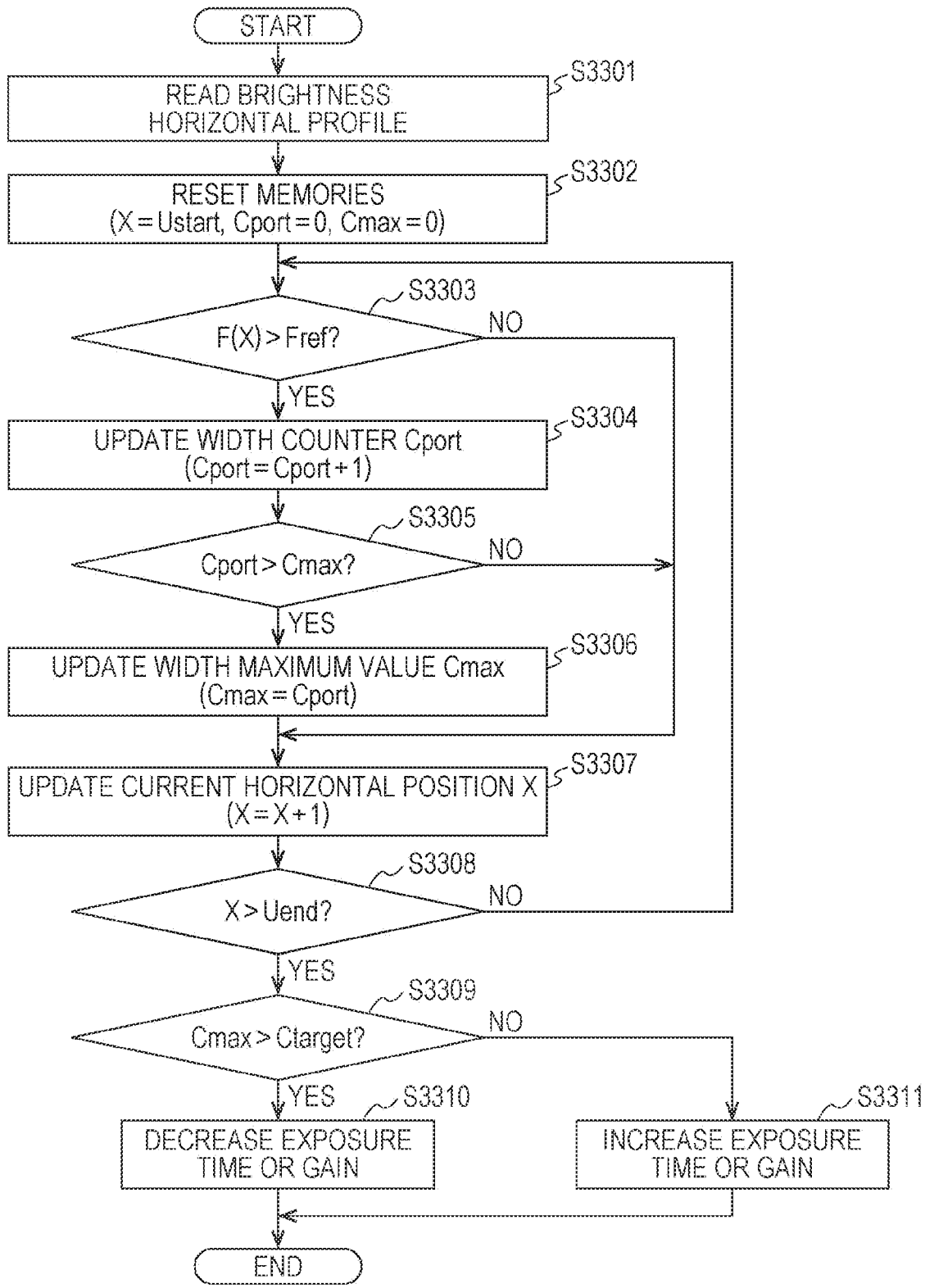
FIG. 33 is a flowchart of a process for performing automatic exposure control of the in-vehicle camera optimized for luminous point separation based on the shape of the brightness horizontal profile within a distant small frame.

FIG. 33 shows a flowchart of a process for performing automatic exposure control of the in-vehicle camera optimized for (or prioritizing) luminous point separation, based on the shape of the brightness horizontal profile within the distant small frame. The aim of the automatic exposure control is to allow the shape of the headlights to satisfy the foregoing mathematical expression (1) when a following vehicle or an oncoming vehicle is shot by the in-vehicle camera in the scene under dark driving environments.

The processing unit 605 first reads the brightness horizontal profile produced at preceding step S706 (step S3301).

Next, the processing unit 605 resets the memories to their initial value (step S3302). Specifically, the processing unit 605 substitutes a starting point horizontal position Ustart within the distant small frame into a horizontal position memory X. The processing unit 605 reads the viewpoint position in the distant small frame from the result of definition of the distant small frame at preceding step S705. The processing unit 605 also resets both a width counter Cport and a peak width maximum value memory Cmax to their initial value of 0.

Next, the processing unit 605 compares a weighted brightness sum value F(x) at a current horizontal position X within the distant small frame to the predetermined threshold value (brightness comparison parameter) Fref (step S3303). The brightness comparison parameter Fref is stored in the memory (ROM) 606. The processing unit 605 reads the brightness comparison parameter Fref from the memory 606 at step S3303.

When the weighted brightness sum value F(x) is larger than the brightness comparison parameter Fref (step S3303: Yes), the current horizontal position X corresponds to a peak portion in the brightness horizontal profile. The processing unit 605 updates the width counter Cport (step S3304) (Cport=Cport+1). Then, the processing unit 605 compares the width counter to the width maximum value Cmax (step S3305). When the width Cport of the peak being counted is larger than the width maximum value Cmax (step S3305: Yes), the processing unit 605 updates the width maximum value Cmax by the width Cport (step S3306).

Upon completion of the process with the current horizontal position X in this manner, the processing unit 605 updates X (step S3307) (X=X+1), and checks whether an end point horizontal position Uend within the distant small frame has been reached, that is, whether the process on the entire brightness horizontal profile is completed (step S3308).

When the end point horizontal position Uend within the distant small frame has not yet been reached (step S3308: No), the processing unit 605 returns to step S3303 to perform repeatedly the foregoing process on the next horizontal position X within the distant small frame.

In contrast, when the end point horizontal position Uend in the distant small frame has been reached (step S3308: Yes), the processing unit 605 compares the width maximum value Cmax of the peak in the brightness horizontal profile to a predetermined target value Ctarget (step S3309). The target value Ctarget is stored in the memory (ROM) 606, and the processing unit 605 reads the target value Ctarget from the memory 606 at step S3303.

When the peak width maximum value Cmax is larger than the target value Ctarget (step S3309: Yes), the two luminous points corresponding to the lamps (headlights or taillights) of the distant vehicle clearly appear as maximum values in the brightness horizontal profile as illustrated in FIG. 31. Accordingly, to avoid overexposure, the processing unit 605 decreases the exposure time or the gain of the in-vehicle camera (step S3310). Alternatively, the processing unit 605 may make some adjustments through the use of iris diaphragm, variable ND filter, or tone correction.

In contrast, when the peak width maximum value Cmax is not larger than the target value Ctarget (step S3309: No), the difference between the maximum values and the minimum value is small in the brightness horizontal profile as illustrated in FIG. 32 and the existence of the luminous points is obscure. This is possibly because the light exposure of the in-vehicle camera is too low, and the luminous points corresponding to the lamps (headlights or taillights) of the distant vehicle appear dark. Thus, the processing unit 605 increases the exposure time or the gain of the in-vehicle camera (step S3311).

The in-vehicle camera related to driving support and distant visual field support needs to catch more correctly distant vehicles possibly approaching the subject vehicle. However, under dark driving environments such as at night or in a tunnel, when the lamps of high-illumination (backlight) surrounding vehicles are shot by the in-vehicle camera, the proportion of the headlights of the distant vehicle as light sources in the viewing field is small in particular.

Accordingly, when the normal automatic light exposure control is applied to perform an average exposure control on the entire screen, overexposure is likely to occur to saturate even peripheral pixels in white, and it is difficult to catch the headlights as two luminous points.

It can be said that the distant vehicle possibly approaching the subject vehicle is driving in the direction of the driving path of the subject vehicle in the area behind the subject vehicle, or is driving in the predicted driving direction of the subject vehicle (the road surface direction along the road on which the subject vehicle is driving) in the area ahead of the subject vehicle.

As described above, the technology disclosed herein is intended to perform automatic exposure control of the in-vehicle camera only with the brightness information within the distant small frame defined with reference to the distant road vanishing point in the driving direction of the subject vehicle. It is expected that the in-vehicle camera shooting the area behind the subject vehicle catches a distant vehicle driving in the direction of the driving path within the distant small frame, and the in-vehicle camera shooting the area ahead of the subject vehicle catches a distant vehicle driving in the predicted driving direction of the subject vehicle within the distant small frame. Therefore, by analyzing the brightness information only within the distant small frame to perform exposure control of the in-vehicle camera, it is possible to shoot the distant vehicle with the headlights illuminated under dark driving environments while avoiding overexposure.

The technology disclosed herein is intended to sum up the brightness values of pixels in one each horizontal line within the distant small frame to decide weights in the individual horizontal lines, and add the weights in the horizontal lines to the brightness values of the pixels in the individual vertical lines to produce a brightness horizontal profile, and perform exposure control of the in-vehicle camera based on the result of analysis of the brightness horizontal profile. Therefore, by producing the brightness horizontal profile only within the distant small frame, it is possible to reproduce the target light sources on a priority basis in an efficient manner with the small memory. As a result, it is possible to shoot the lamps of an automobile (the illuminated headlights of the distant vehicle at night or the like) within the distant small frame in a preferable manner while avoiding overexposure.

INDUSTRIAL APPLICABILITY

The technology disclosed herein has been explained in detail with reference to the specific embodiments. However, it is obvious that persons skilled in the art can modify the embodiments or replace the same by any others without deviating from the gist of the technology disclosed herein.

The technology disclosed herein can be applied to automatic exposure control of the in-vehicle camera under dark driving environments such as at night or in a tunnel to shoot high-illuminous lamps (luminous points) such as the headlights or taillights of a distant vehicle while avoiding overexposure.

The technology disclosed herein is not limited to standard-sized automobiles but may be applied to various types of vehicles equipped with in-vehicle cameras such as medium-sized automobiles, large-sized automobiles, and motorcycles.

Briefly, although the technology disclosed herein has been explained taking some examples, the descriptions therein should not be interpreted in a limited way. The claims should be referred to determine the gist of the technology disclosed herein. The technology disclosed herein can have the following configurations:

(1)

A vehicle camera system including:

a vehicle camera mounted in a vehicle configured to capture surroundings of the vehicle; and control circuitry configured to control an exposure level of an image captured by the vehicle camera, the control of the exposure level being based on brightness information of a detection area set within the image, the detection area being a portion of the captured image and configured to output the image having exposure control performed thereon to a display.

(2)

The vehicle camera system according to (1), wherein the control circuitry is further configured to control the exposure level of the image captured by the vehicle camera such that light sources of another vehicle in the detection area are displayed separately within the image by the display.

(3)

The vehicle camera system according to (1)-(2), wherein the control circuitry is further configured to determine whether to perform the exposure control depending on settings of the vehicle camera system.

(4)

The vehicle camera system according to (1)-(3), wherein the control circuitry is configured to determine whether to perform the exposure control depending on a type of road on which the vehicle is driving.

(5)

The vehicle camera system according to (1)-(4), wherein the control circuitry is further configured to determine whether to perform the exposure control depending on environmental conditions present while the vehicle is driving.

(6)

The vehicle camera system according to (1)-(5), wherein the control circuitry is further configured to set the detection area with reference to a vanishing point in the image, and perform the exposure control based on the brightness information within the detection area.

(7)

The vehicle camera system according to (1)-(6), wherein the control circuitry is further configured to correct the vanishing point based on a course of the vehicle driving path in the area behind the vehicle.

(8)

The vehicle camera system according to (1)-(7), wherein the control circuitry is configured to set the detection area based on a relative position of the vanishing point to a reference point in the image captured by the vehicle camera.

(9)

The vehicle camera system according to (1)-(8), wherein the control circuitry is configured to perform exposure control on the image captured by the vehicle camera based on the brightness information which includes a result of a brightness horizontal profile produced within the detection area.

(10)

The vehicle camera system according to (1)-(9), wherein the control circuitry is configured to sum up brightness values of pixels in each horizontal line within the detection area in order to determine weights for the respective individual horizontal lines, and to add the weights for the respective individual horizontal lines to the brightness values of pixels in order to produce the brightness horizontal profile.

(11)
The vehicle camera system according to (1)-(10), wherein the control circuitry is configured to detect whether there are lights of another vehicle within the detection area, and when detecting the presence of the lights of the another vehicle within the detection area, control the exposure level of the image captured by the vehicle camera such that the lights of the another vehicle are displayed separately on the display.

(12)
The vehicle camera system according to (1)-(11), wherein the control circuitry is configured to detect whether the lights of the another vehicle are within the detection area based on brightness information of a minimum value between two adjacent maximum values included in the brightness horizontal profile.

(13)
The vehicle camera system according to (1)-(12), wherein, when an interval between the adjacent maximum values falls within a predetermined range and an average of the adjacent maximum values is a predetermined number of times larger than the minimum value, the control circuitry is configured to determine that the lights of the another vehicle are within the detection area.

(14)
The vehicle camera system according to (1)-(12), wherein when the interval between the adjacent maximum values falls within a predetermined range and the average of the adjacent maximum values is more than a predetermined value, the control circuitry is configured to determine that the lights of the another vehicle are within the detection area.

(15)
The vehicle camera system according to (1)-(14), further comprising an alarm, wherein when the exposure control is being performed, the control circuitry is configured to notify a driver in advance with the alarm.

(16)
The vehicle camera system according to (1)-(15), wherein the control circuitry is configured to perform exposure control on the image captured by the vehicle camera such that lights of another vehicle are displayed separately on the display, the control circuitry performing the exposure control based on a brightness horizontal profile produced within the detection area.

(17)
The vehicle camera system according to (1)-(16), wherein the control circuitry is configured to perform exposure control on the image captured by the vehicle camera based on an evaluation value determined by dividing an average of two maximum values by a minimum value disposed between the maximum values in the brightness horizontal profile.

(18)
The vehicle camera system according to (1)-(16), wherein the control circuitry is configured to perform exposure control on the image captured by the vehicle camera based on a distance of peaks of maximum values in the brightness horizontal profile.

(19)
The vehicle camera system according to (1)-(18), wherein the control circuitry is further configured to control exposure level of the detection area of the image captured by the vehicle camera.

(20)
An image processing apparatus, including:
control circuitry configured to control an exposure level of an image captured by a vehicle camera, the control of the exposure level being based on brightness information of a detection area set within the image, the detection area being a portion of the captured image and configured to output the image having exposure control performed thereon to a display.

(21)
An image processing method, including:
controlling, using control circuitry, an exposure level of an image captured by a vehicle camera, the control of the exposure level being based on brightness information of a detection area set within the image, the detection area being a portion of the captured image; and
outputting the image having exposure control performed thereon to a display.

(22)
An in-vehicle camera system comprising:
an in-vehicle camera that is mounted in a vehicle to shoot surroundings of the vehicle; and
a control unit that controls exposure of the vehicle based on brightness information of a detection area set within an image shot by the in-vehicle camera.

(23)
The in-vehicle camera system according to (22), wherein the control unit shifts to an exposure control mode that prioritizes separation of light sources of a vehicle other than the vehicle depending on the result of detection of the light sources within the detection area.

(24)
The in-vehicle camera system according to (23), wherein the control unit determines whether to perform the detection of the light sources depending on settings in the in-vehicle camera system.

(25)
The in-vehicle camera system according to (24), wherein the control unit determines whether to perform the detection of the light sources depending on the type of the road on which the vehicle is driving.

(26)
The in-vehicle camera system according to (23), wherein the control unit determines whether to perform the detection of the light sources depending on driving environments of the vehicle.

(27)
The in-vehicle camera system according to (22), wherein the control unit sets the detection area with reference to a distant road vanishing point in a driving direction of the vehicle, and performs exposure control of the in-vehicle camera based on the result of analysis of brightness information within the detection area.

(28)
The in-vehicle camera system according to (27), wherein the control unit corrects the distant road vanishing point based on a direction of a driving path of the vehicle in the area behind the vehicle, or corrects the distant road vanishing point based on a predicted driving direction of the vehicle in the area ahead of the vehicle.

(29)
The in-vehicle camera system according to (27), wherein the control unit determines a place a predetermined distance behind the vehicle in the direction of the driving path of the vehicle as an approximate distant road vanishing point, or determines a place the predetermined distance ahead of the vehicle in a road surface direction along the road on which the vehicle is driving as an approximate distant road vanishing point.

(30)

The in-vehicle camera system according to (27), wherein the control unit sets the detection area based on a relative position of the distant road vanishing point in the direction of the vehicle to a distant point at infinity in the image shot by the in-vehicle camera.

(31)

The in-vehicle camera system according to (27), wherein the control unit performs exposure control of the in-vehicle camera based on the result of analysis of a brightness horizontal profile produced within the detection area as brightness information within the detection area.

(32)

The in-vehicle camera system according to (31), wherein the control unit sums up brightness values of pixels at least in one each horizontal line within the detection area to decide weights in the individual horizontal lines, and adds the weights in the horizontal lines to the brightness values of pixels in individual vertical lines to produce the brightness horizontal profile.

(33)

The in-vehicle camera system according to (27), wherein the control unit detects whether there are the lamps of the other vehicle within the detection area, and when detecting the presence of the lamps of the other vehicle within the detection area, controls exposure of the in-vehicle camera with priority given to separation of luminous points of the lamps of the other vehicle.

(34)

The in-vehicle camera system according to (33), wherein the control unit detects whether there are the lamps of the other vehicle within the detection area, based on brightness information of a minimum value between two adjacent maximum values included in the brightness horizontal profile.

(35)

The in-vehicle camera system according to (34), wherein, when the interval between the maximum values falls within a predetermined range and the average of the maximum values is predetermined times larger than the minimum value or more or the average of the maximum values is equal to or more than a predetermined value, the control unit determines that there are the lamps of the other vehicle within the detection area.

(36)

The in-vehicle camera system according to (27), wherein the control unit decides an exposure control mode for the in-vehicle camera based on whether the lamps of the other vehicle are detected within the detection area.

(37)

The in-vehicle camera system according to (36), further comprising an image output unit or a sound output unit, wherein when changing the exposure control mode, the control unit notifies of that in advance with the use of at least one of an image, a sound, and a vibration.

(38)

The in-vehicle camera system according to (22), wherein the control unit performs exposure control of the in-vehicle camera with priority given to separation of luminous points of the lamps of the other vehicle, based on a brightness horizontal profile produced within the detection area.

(39)

The in-vehicle camera system according to (38), wherein the control unit performs exposure control of the in-vehicle camera, based on an evaluation value determined by dividing the average of two adjacent maximum values by a minimum value between the maximum values included in the brightness horizontal profile.

(40)

The in-vehicle camera system according to (38), wherein the control unit performs exposure control of the in-vehicle camera, based on a maximum value of a peak width exceeding a predetermined threshold value in the brightness horizontal profile.

(41)

An image processing apparatus that controls exposure of an in-vehicle camera mounted in a vehicle, based on brightness information in a detection area set within an image shot by the in-vehicle camera.

REFERENCE SIGNS LIST

600 In-vehicle camera system
601 Image sensor
602 Yaw angle detection unit
603 Pitch angle detection unit
604 GPS sensor
605 Processing unit
606 Memory
607 Setting input unit
608 Image output unit
609 Sound output unit

The invention claimed is:

1. A vehicle camera system, comprising:
control circuitry; and
an imaging sensor mounted in a first vehicle, wherein
  the imaging sensor is configured to:
    capture an image of surroundings of the first vehicle; and
    output the captured image to the control circuitry,
  the control circuitry is configured to:
    determine, for each horizontal line within a detection area of the captured image, a respective specific brightness value based on addition of brightness values of pixels in each horizontal line within the detection area of the captured image;
    determine a corresponding weight for each horizontal line based on the respective specific brightness value;
    generate a brightness horizontal profile based on addition of the corresponding weight for each horizontal line to the brightness values of the pixels in each horizontal line; and
    execute an exposure control process based on the generated brightness horizontal profile,
  the generated brightness horizontal profile is based on a portion of the captured image, and
  the portion of the captured image corresponds to the detection area within the captured image to separately display lights of a second vehicle on a display screen.

2. The vehicle camera system according to claim 1, wherein the control circuitry is further configured to:
  set the detection area with reference to a vanishing point in the captured image; and
  execute the exposure control process based on the brightness horizontal profile within the detection area.

3. The vehicle camera system according to claim 2, wherein the control circuitry is further configured to correct the vanishing point based on a course of a vehicle driving path in an area behind the first vehicle.

4. The vehicle camera system according to claim 2, wherein the control circuitry is further configured to set the detection area based on a relation of a position of the vanishing point with a reference point in the captured image.

5. The vehicle camera system according to claim 1, wherein the exposure control process comprises at least one of exposure time control, gain control, or a combination thereof.

6. The vehicle camera system according to claim 1, wherein the control circuitry is further configured to:
  detect the lights of the second vehicle within the detection area; and
  execute the exposure control process based on a presence of the lights of the second vehicle within the detection area, wherein the lights of the second vehicle are displayed separately on the display screen.

7. The vehicle camera system according to claim 6, wherein the control circuitry is further configured to detect the lights of the second vehicle within the detection area based on a local minimum value between two adjacent maximum values in the brightness horizontal profile.

8. The vehicle camera system according to claim 7, wherein
  the control circuitry is further configured to determine the lights of the second vehicle within the detection area based on an interval between the two adjacent maximum values and an average of the two adjacent maximum values,
  the interval is within a specific range, and
  the average is a specific number of times larger than the local minimum value.

9. The vehicle camera system according to claim 7, wherein
  the control circuitry is further configured to determine the lights of the second vehicle within the detection area based on an interval between the two adjacent maximum values and an average of the adjacent maximum values,
  the interval is within a specific range, and
  the average is more than a specific value.

10. The vehicle camera system according to claim 1, wherein the control circuitry is further configured to:
  determine an evaluation value based on a division of an average of two adjacent maximum values by a local minimum value in the brightness horizontal profile, wherein the local minimum value is between the two adjacent maximum values; and
  execute the exposure control process on the captured image based on the evaluation value.

11. The vehicle camera system according to claim 1, wherein the control circuitry is further configured to execute the exposure control process on the captured image based on a distance of peaks of two adjacent maximum values in the brightness horizontal profile.

12. The vehicle camera system according to claim 1, wherein the control circuitry is further configured to execute the exposure control process based on settings of the vehicle camera system.

13. The vehicle camera system according to claim 1, wherein the control circuitry is further configured to execute the exposure control process based on environmental conditions associated with the surroundings of the first vehicle.

14. The vehicle camera system according to claim 1, wherein the control circuitry is configured to execute the exposure control process based on a type of road on which the first vehicle is driven.

15. The vehicle camera system according to claim 1, further comprising
  an alarm, wherein
    in the exposure control process, the control circuitry is further configured to notify a driver with the alarm.

16. A vehicle camera system, comprising:
  control circuitry; and
  an imaging sensor mounted in a first vehicle, wherein
    the imaging sensor is configured to:
      capture an image of surroundings of the first vehicle; and
      output the captured image to the control circuitry,
    the control circuitry is configured to:
      determine an evaluation value based on division of a maximum value in a brightness horizontal profile by a local minimum value in the brightness horizontal profile; and
      execute an exposure control process based on the determined evaluation value,
    the local minimum value is between two adjacent maximum values in the brightness horizontal profile,
    the brightness horizontal profile is based on a portion of the captured image corresponding to a detection area within the captured image, and
    lights of a second vehicle are displayed separately on a display screen.

17. The vehicle camera system according to claim 16, wherein the exposure control process comprises at least one of exposure time control, gain control, or a combination thereof.

18. The vehicle camera system according to claim 17, wherein
  the control circuitry is further configured to increase at least one of an exposure time associated with the imaging sensor or a gain associated with the imaging sensor, and
  the at least one of the exposure time or the gain is increased based on the evaluation value that is larger than a specific threshold.

19. The vehicle camera system according to claim 17, wherein
  the control circuitry is further configured to decrease at least one of an exposure time associated with the imaging sensor or a gain associated with the imaging sensor, and
  the at least one of the exposure time or the gain is decreased based on the evaluation value that is smaller than a specific threshold.

* * * * *